United States Patent
Breed et al.

(10) Patent No.: US 6,370,475 B1
(45) Date of Patent: Apr. 9, 2002

(54) ACCIDENT AVOIDANCE SYSTEM

(75) Inventors: David S. Breed, Boonton Township, Morris County, NJ (US); Wilbur E. Duvall, Kimberling City, MO (US); Wendell C. Johnson, San Diego, CA (US)

(73) Assignee: Intelligent Technologies International Inc., Denville, NJ (US)

( * ) Notice: Subject to any disclaimer, the term of this patent is extended or adjusted under 35 U.S.C. 154(b) by 0 days.

(21) Appl. No.: 09/177,041

(22) Filed: Oct. 22, 1998

Related U.S. Application Data

(60) Provisional application No. 60/062,729, filed on Oct. 22, 1997.

(51) Int. Cl.$^7$ .............................. G05D 1/02; G01S 5/14; G08G 1/16
(52) U.S. Cl. .................. 701/301; 701/215; 342/357.08; 340/436
(58) Field of Search .................. 701/301, 213, 701/45, 23, 117, 216, 215; 342/357.06, 357.09, 357.08; 340/436

(56) References Cited

U.S. PATENT DOCUMENTS

| | | | |
|---|---|---|---|
| 4,298,280 A | 11/1981 | Harney | 356/5 |
| 4,352,105 A | 9/1982 | Harney | 343/5 CD |
| 4,521,861 A | 6/1985 | Logan et al. | 364/517 |
| 5,128,669 A | 7/1992 | Dadds et al. | 340/901 |
| 5,177,685 A | 1/1993 | Davis et al. | 364/443 |
| 5,181,037 A | 1/1993 | Komatsu | 342/70 |
| 5,235,316 A | 8/1993 | Qualizza | 340/436 |
| 5,249,128 A | 9/1993 | Markandey et al. | 364/426.04 |
| 5,272,483 A | 12/1993 | Kato | 342/357 |
| 5,314,037 A | 5/1994 | Shaw et al. | 180/169 |
| 5,367,463 A | 11/1994 | Tsuji | 364/449 |
| 5,381,338 A | * 1/1995 | Wysocki et al. | 701/207 |

(List continued on next page.)

FOREIGN PATENT DOCUMENTS

| | | |
|---|---|---|
| DE | 4434789 A1 | * 4/1996 |
| JP | 6-337286 | * 12/1994 |
| JP | 7-200861 | * 8/1995 |

OTHER PUBLICATIONS

Singh et al.; Autonomous vehicle using WADGPS; IEEE: Intelligent Vehicles '95 Symposium; Sep. 1995; pp. 370–375.*

(List continued on next page.)

Primary Examiner—Michael J. Zanelli
(74) Attorney, Agent, or Firm—Brian Roffe

(57) ABSTRACT

System and method for preventing vehicle accidents in which the absolute position of the vehicle is determined, e.g., using a satellite-based positioning system such as GPS, and the location of the vehicle relative to the edges of the roadway is then determined based on the absolute position of the vehicle and stored data relating to edges of roadways on which the vehicle may travel. A system or component within the vehicle is initiated, e.g., an alarm or warning system, or the operation of a system or component is affected, e.g., an automatic guidance system, if the location of the vehicle approaches close to an edge of the roadway or intersects with an edge of the roadway.

36 Claims, 7 Drawing Sheets

U.S. PATENT DOCUMENTS

| | | | | |
|---|---|---|---|---|
| 5,383,127 A | | 1/1995 | Shibata | 364/449 |
| 5,416,712 A | | 5/1995 | Geier et al. | 364/450 |
| 5,438,517 A | | 8/1995 | Sennott et al. | 364/449 |
| 5,450,329 A | * | 9/1995 | Tanner | 701/213 |
| 5,463,384 A | | 10/1995 | Juds | 340/903 |
| 5,467,072 A | | 11/1995 | Michael | 340/436 |
| 5,477,458 A | | 12/1995 | Loomis | 364/449 |
| 5,479,173 A | | 12/1995 | Yoshioka et al. | 342/70 |
| 5,486,832 A | | 1/1996 | Hulderman | 342/70 |
| 5,504,482 A | | 4/1996 | Schreder | 340/995 |
| 5,506,584 A | | 4/1996 | Boles | 342/42 |
| 5,523,765 A | | 6/1996 | Ichikawa | 342/451 |
| 5,528,391 A | | 6/1996 | Elrod | 359/36 |
| 5,529,138 A | | 6/1996 | Shaw et al. | 180/169 |
| 5,530,447 A | | 6/1996 | Henderson et al. | 342/70 |
| 5,530,651 A | | 6/1996 | Uemura et al. | 364/461 |
| 5,540,298 A | | 7/1996 | Yoshioka et al. | 180/169 |
| 5,570,087 A | | 10/1996 | Lemelson | 340/870.05 |
| 5,572,428 A | | 11/1996 | Ishida et al. | 364/461 |
| 5,572,482 A | | 11/1996 | Hoshizaki et al. | 365/233 |
| 5,576,715 A | | 11/1996 | Litton et al. | 342/357 |
| 5,576,972 A | | 11/1996 | Harrison | 364/516 |
| 5,583,513 A | | 12/1996 | Cohen | 342/357 |
| 5,585,798 A | | 12/1996 | Yoshioka et al. | 342/70 |
| 5,587,715 A | | 12/1996 | Lewis | 342/357 |
| 5,606,506 A | | 2/1997 | Kyrtsos | 364/449.1 |
| 5,613,039 A | | 3/1997 | Wang et al. | 395/22 |
| 5,619,212 A | | 4/1997 | Counselman, III | 342/357 |
| 5,621,646 A | | 4/1997 | Enge et al. | 364/449 |
| 5,699,056 A | * | 12/1997 | Yoshida | 340/905 |
| 5,828,336 A | * | 10/1998 | Yunck et al. | 342/357 |
| 5,841,367 A | * | 11/1998 | Giovanni | 340/903 |
| 5,901,171 A | | 5/1999 | Kohli et al. | 375/200 |
| 5,907,293 A | * | 5/1999 | Tognazzini | 340/903 |
| 5,926,117 A | * | 7/1999 | Gunji et al. | 340/988 |
| 5,926,126 A | * | 7/1999 | Engelman | 342/70 |
| 5,952,941 A | | 9/1999 | Mardirossian | 340/936 |
| 5,983,161 A | * | 11/1999 | Lemelson et al. | 701/301 |
| 6,014,608 A | * | 1/2000 | Seo | 701/207 |

OTHER PUBLICATIONS

Centerline Survey, B. Holmgren, National Land Survey of Sweden No Date.

Autovue: Active Lane Departure Warning System, Odetics. Copyright 1997.

V. Morellas et al., Preview Based Control of a Tractor Trailer Using DGPS for Preventing Road Departure Accidents, 1998 IEEE International Conference on Intelligent Vehicles, pp. 797–805.

S. Bajikar et al., Evaluation of In–Vehicle GPS–Based Lane Position Sensing for Preventing Road Departure, 1998 IEEE International Conference on Intelligent Vehicle, pp. 397–402.

B. Schiller et al., Collision Avoidance for Highway Vehicles Using the Virtual Bumper Controller, 1998 IEEE International Conference on Intelligent Vehicles, pp. 149–155.

SRI International, Centimeter–Level GPS for Highway Systems, J.W. Sinko et al., Jul., 1998.

SRI International, An Evolutionary Automated Highway System Concept Based on GPS, J.W. Sinko, Sep., 1996 (p. 5, second column to p. 7).

SRI International, Using GPS for Automated Vehicle Convoying, T.M. Nguyen, Sep. 1998.

* cited by examiner

ACCIDENT AVOIDANCE SYSTEM

CROSS REFERENCE TO RELATED APPLICATION

This application claims domestic priority of U.S. provisional patent application Serial No. 60/062,729 filed Oct. 22, 1997.

1. BACKGROUND OF THE INVENTION

1.1. Field of the Invention

This invention is in the fields of automobile safety, intelligent highway safety systems, accident avoidance, accident elimination, collision avoidance, blind spot detection, anticipatory sensing, automatic vehicle control, intelligent cruise control, automotive navigation and other automobile and truck safety, navigation and control related fields.

There are two major efforts underway that will significantly affect the design of automobiles and highways. The first is involved with preventing deaths and serious injuries from automobile accidents. The second involves the attempt to reduce the congestion on highways. In the first case, there are approximately forty thousand (40,000) people killed each year in the United States by automobile accidents and another several hundred thousand are seriously injured. In the second case, hundreds of millions of man-hours are wasted every year by people stuck in traffic jams on the world's roadways. There have been many attempts to solve both of these problems; however, no single solution has been able to do so.

When a person begins a trip using an automobile, he or she first enters the vehicle and begins driving, first out of the parking space and then typically onto a local or city road and then onto a highway. In leaving the parking space, he or she may be at risk from an impact of a vehicle traveling on the road. The driver must check his or her mirrors to avoid such an event and several electronic sensing systems have been proposed which would warn the driver that a collision is possible. Once on the local road, the driver is at risk of being impacted from the front, side and rear, and electronic sensors are under development to warn the driver of such possibilities. Similarly, the driver may run into a pedestrian, bicyclist, deer or other movable object and various sensors are under development which will warn the driver of these potential events. These various sensors include radar, optical, ultrasonic, and a variety of others sensors, each of which attempts to solve a particular potential collision event. It is important to note that in none of these cases is there sufficient confidence in the decision that the control of the vehicle is taken away from the driver.

In some proposed future Intelligent Transportation System (ITS) designs, hardware of various types is embedded into the highway and sensors which sense this hardware are placed onto the vehicle so that it can be accurately guided along a lane of the highway. In various other systems, cameras are used to track lane markings or other visual images to keep the vehicle in its lane. However, for successful ITS, additional information is needed by the driver, or the vehicle control system, to take into account weather, road conditions, congestion etc., which typically involves additional electronic hardware located on or associated with the highway as well as the vehicle. From this discussion, it is obvious that a significant number of new electronic systems are planned for installation onto automobiles. However, to date, no product has been proposed or designed which combines all of the requirements into a single electronic system. This is the intent of this invention.

The safe operation of a vehicle can be viewed as a process in the engineering sense. To achieve safe operation, first the process must be designed and then a vehicle control system must be designed to implement the process. The goal of a process designer is to design the process so that it does not fail. The fact that so many people are being seriously injured and killed in traffic accidents and the fact that so much time is being wasted in traffic congestion is proof that the current process is not working and requires a major redesign. To design this new process the information required by the process must be identified, the source of that information determined and the process designed so that the sources of information can communicate effectively to the user of the information, which will most often be the vehicle control system. Finally, the process must have feedback that self-corrects the process when it is tending toward failure.

Although it is technologically feasible, it is probably socially unacceptable at this time for a vehicle safety system to totally control the vehicle. The underlying premise of this invention, therefore, is that people will continue to operate their vehicle and control of the vehicle will only be seized by the control system when such an action is required to avoid an accident or when such control is needed for the orderly movement of vehicles through potentially congested areas on a roadway. When this happens, the vehicle operator will be notified and given the choice of exiting the road at the next opportunity. In some implementations, especially when this invention is first implemented on a trail basis, control will not be taken away from the vehicle operator but a warning system will alert the driver of a potential collision.

Consider several scenarios and what information is required for the vehicle control process to prevent accidents. In one case, a driver is proceeding down a country road and falls asleep and the vehicle begins to leave the road, perhaps heading toward a tree. In this case, the control system would need to know that the vehicle was about to leave the road and for that it must know the position of the vehicle relative to the road. One method of accomplishing this would be to place a wire down the center of the road and to place sensors within the vehicle to sense the position of the wire relative to the vehicle. An alternate approach would be for the vehicle to know exactly where it is on the surface of the earth and to also know exactly where the edge of the road is. These approaches are somewhat different because in the former solution every road in the world would require the placement of appropriate hardware as well as the maintenance of this hardware. This is obviously impractical. In the second case, the use of the global positioning satellite system (GPS), augmented by additional systems to be described below, will provide the vehicle control system with an accurate knowledge of its location. Whereas it would be difficult to install and maintain hardware such as a wire down the center of the road for every road in the world, it is not difficult to survey every road and record the location of the edges, and the lanes for that matter, of each road. This information must then be made available through one or more of a variety of techniques to the vehicle control system.

Another case might be where a driver is proceeding down a road and decides to change lines while another vehicle is in the driver's blind spot. Various companies are developing radar, ultrasonic or optical sensors to warn the driver if the blind spot is occupied. The driver may or may not heed this warning, perhaps due to an excessive false alarm rate, or he or she may have become incapacitated, or the system may fail to detect a vehicle in the blind spot and thus the system will fail. Consider an alternative technology where again each vehicle knows precisely where it is located on the earth surface and additionally can communicate this information to all other vehicles within a certain potential danger zone relative to the vehicle. Now, when the driver begins to change lanes, his or her vehicle control system knows that there is another vehicle in the blind spot and therefore will either warn the driver or else prevent him or her from changing lanes thereby avoiding the accident. Similarly, if a vehicle is approaching a stop sign or red traffic light and the operator fails to bring the vehicle to a stop, if the existence of this traffic light or stop sign has been made available to the vehicle control system, the system can warn the driver or seize control of the vehicle to stop the vehicle and prevent a potential accident. Additionally, if an operator of the vehicle decides to proceed across an intersection without seeing an oncoming vehicle, the control system will once again know the existence and location and perhaps velocity of the oncoming vehicle and warn or prevent the operator from proceeding across the intersection.

Consider another example where water on the surface of a road is beginning to freeze. Probably the best way that a vehicle control system can know that the road is about to become slippery, and therefore that the maximum vehicle speed must be significantly reduced, is to get information from sensors located on the highway that are capable of determining this condition and communicating it to the vehicle. Alternately, a local weather station can determine that such conditions are likely to exist and communicate that information to every vehicle in the area. A set of sensors could be placed on each vehicle but since all vehicles in the area would need the identical information and since the maximum vehicle speed is to be controlled, it is both costly and inaccurate to rely on vehicle resident sensors. Nevertheless, an alternate approach is to put temperature and humidity sensors on each vehicle and provide for that information to be communicated between vehicles when necessary.

Countless other examples exist, however, from those provided above it can be seen that for the vehicle control system to function without error, certain types of information must be accurately provided. These include information permitting the vehicle to determine its absolute location and means for vehicles near each other to communicate this location information to each other. Additionally, map information that accurately provides boundary and lane information of the road must be available. Also, critical weather or road-condition information is necessary. The road location information need only be generated once and changed whenever the road geometry is altered. This information can be provided to the vehicle through a variety of techniques including prerecorded media such as CD-ROMs or through communications from transmitters located in proximity to the vehicle, satellites, radio and cellular phones.

Many roads in the world are congested and are located in areas where the cost of new road construction is prohibitive or such construction is environmentally unacceptable. It has been reported that an accident on such a highway typically ties up traffic for a period of approximately four times the time period required to clear the accident. Thus, by eliminating accidents, a substantial improvement in the congested highway problem results. This of course is insufficient. On such highways each vehicle travels with a different spacing, frequently at different speeds and in the wrong lanes. If the proper spacing of the vehicles could be maintained, and if the risk of an accident could be substantially eliminated, vehicles under automatic control could travel at substantially higher velocities and in a more densely packed configuration thereby substantially improving the flow rate of vehicles on the highway by as much as a factor of 3 to 4 times. This not only will reduce congestion but also improve air pollution. Once again, if each vehicle knows exactly where it is located, can communicate its location to surrounding vehicles and knows precisely where the road is located, then the control system in each vehicle has sufficient information to accomplish this goal.

The information listed above may still be insufficient. The geometry of a road or highway can be determined once and for all until erosion or construction alters the road. Properly equipped vehicles can know their location and transmit that information to other properly equipped vehicles. There remains a variety of objects whose location is not fixed, which have no transmitters and which can cause accidents. These objects include broken down vehicles, animals such as deer which wander onto highways, pedestrians, bicycles, objects which fall off of trucks, and especially other vehicles which are not equipped with location determining systems and transmitters for transmitting that information to other vehicles. Part of this problem can be solved for congested highways by restricting access to these highways to vehicles that are properly equipped. Also, these highways are typically in urban areas and access by animals can be effectively eliminated. Heavy fines can be imposed on vehicles that drop objects onto the highway. Finally, since every vehicle operator becomes part of the process, each such operator becomes a potential source of information to help prevent catastrophic results. Thus, each vehicle should also be equipped with a system of essentially stopping the process in an emergency. Such a system could be triggered by the operator strongly applying the brakes, rapidly turning the steering wheel or by activating a manual switch when the operator observes a critical situation but is not himself in immediate danger. An example of the latter case is where a driver witnesses a box falling off of a truck in an adjacent lane.

To solve the remaining problems, therefore, each vehicle should also be equipped with an anticipatory collision sensing system, or collision forecasting system, which is capable of identifying or predicting and reacting to a pending accident. As the number of vehicles equipped with the control system increases, the need for the collision forecasting system will diminish.

Once again, the operator will continue to control his vehicle provided he or she remains within certain constraints. These constraints are like a corridor. As long as the operator maintains his vehicle within this allowed corridor, he or she can operate that vehicle without interference from the control system. That corridor may include the entire width of the highway when no other vehicles are present or it may be restricted to all East-bound lanes, for example. In still other cases, that corridor may be restricted to a single line and additionally, the operator may be required to keep his vehicle within a certain spacing tolerance from the preceding vehicle. If a vehicle operator wishes to exit a congested highway, he could operate his turn signal that would inform the control system of this desire and permit the vehicle to safely exit from the highway. It can also inform other adjacent vehicles of the operator's intent, which could then automatically cause those vehicles to provide space for lane changing, for example. The highway control system is thus a network of individual vehicle control systems rather than a single highway resident computer system.

1.2. Review of Relevant Prior Art

The complete disclosure of the following patents is incorporated by reference herein in its entirety. Also, the systems disclosed in the patents may be used in the invention in appropriate part.

U.S. Pat. Nos. 4,352,105 and 4,298,280 to Harney describe an infrared radar system and a display system for use by aircraft. In particular, these patents discloses an infrared radar system that provides high resolution, bad whether penetration, day-night operation and which can provide simultaneous range, intensity and high resolution angular information. The technology uses $CO_2$ laser and a 10.6 micron heterodyne detection. It is a compact imaging infrared radar system that can be used with the invention described herein. Harney applies this technology to aircraft and does not contemplate its application to collision avoidance or for information transmission for automobiles.

U.S. Pat. No. 4,521,861 to Logan, describes a method and apparatus for enhancing radiometric imaging. This invention discloses a method and apparatus for enhancing target detection through the utilization of an imaging radiometer. The radiometer, which is a passive thermal receiver, detects the reflected and emitted thermal radiation of targets. Prior to illumination, foliage will appear hot due to its high emissivity and metals will appear cold due to their low emissivities. When the target is momentarily illuminated foliage appears dark while metals appear hot. By subtracting the unilluminated image from the illuminated image, metal targets are enhanced. The teachings of this patent thus have applicability to the instant invention as discussed below.

U.S. Pat. No. 5,272,483 to Kato describes an automobile navigation system. This invention attempts to correct for the inaccuracies in the GPS system through the use of an inertial guidance, geomagnetic sensor, or vehicle crank shaft speed sensor. However, it is unclear as to whether the second position system is actually more accurate than the GPS system. This combined system, however, cannot be used for sub-meter positioning of an automobile.

U.S. Pat. Nos. 5,314,037 and 5,529,138 to Shaw et al. describe a collision avoidance system using laser radar and a laser gyroscope. The following paragraphs are quoted from U.S. Pat. No. 5,314,037 that provides an excellent background the collision avoidance prior art.

"The use of radars in collision avoidance systems is generally known. U.S. Pat. No. 4,403,220 dated Sep. 6, 1983 discloses a radar system adapted to detect relative headings between aircraft or ships at sea and a detected object moving relative to the ground. The system is adapted to collision avoidance application. U.S. Pat. No. 4,072,945 dated Feb. 7, 1978 discloses a radar operated collision avoidance system for roadway vehicles. The system senses the vehicle speed relative to an object and its distance and decides whether the vehicle is approaching the object at a dangerously high speed. A minimum allowable distance represented by a digital code is stored in a memory of a computer and the minimum allowable distance is compared with the distance sensed by the radar."

"Most of the prior art collision avoidance systems use microwave radars as the ranging and detecting device. There are multiple disadvantages of these automobile collision avoidance systems when microwave radars are used. One major disadvantage is related to the beam width, that is the angular width of the main lobe of the radar, and the associated angular resolution of the microwave radar. The beam width is inversely proportional to the antenna diameter in wavelength. With the limitation of the antenna size, it is very difficult to make a reasonable size microwave radar with beam width less than 3 degrees. At the desired scanning distance, this beam width will scan an area that is much too big and thus is too nonspecific and difficult to differentiate the received echoes. Besides getting echo from another car in front of it, this radar will also receive echoes from roadside signs, trees or posts, or bridges overpassing an expressway. On highways with divided lanes the microwave radar will receive echoes from cars 2 or 3 lanes away and has difficulty to in differentiating them from echoes coming from objects in the same lane. Because of the poor angular resolution of microwave radars, the direction of objects can not be specifically determined and objects too close to one another cannot be separated. The angular resolution of microwave radars is not small enough for them to be effectively used to monitor roadway traffic. The other disadvantage is that the microwave radars have difficulty in distinguishing radar signals coming from adjacent cars with similar equipment. If there are more than two cars with the same radar equipment on the same scene, the signals become very confusing."

In the Shaw invention laser radars are used as scanning and ranging devices. These laser radar devices have much smaller beam and angular resolution and give more specific and precise information of the detected object's direction and distance. Laser radars will also be used in the invention disclosed herein but in a somewhat different manner. Here, the laser radars will obtain many measurements from many points on an object and use the information to form a three dimensional representation of the object. Also, the vectorial velocity in general will be obtained by a comparison of points on this image over time. In this manner only a single laser radar unit is required rather than at least two in the case of Shaw.

Shaw also discloses the use of a steering wheel rotation sensor, however, the laser gyro is preferred since the directional information is much more reliable.

"Radars have been used widely in detection of speed and distance of moving objects. Most radars use electromagnetic waves in the microwave frequency range. They are divided into pulse radars and continuous radars. In a pulse radar, the transmitter sends out radar signals through the antenna in pulses with extremely short duration, millionth of a second for example. The next pulse is emitted after the echoes have been received. The radars use Doppler principle to calculate the speed by the amount of frequency shift. The Doppler shift is caused by the targets moving toward or away from the radar in the radar's radial direction. Pulse radar can detect the speed and distance of a target. A simple continuous wave radar can give the speed information, but not the distance information. A frequency modulated continuous wave radar can detect both the speed and the distance."

"The angular resolution of a radar depends on the beam width. If two targets are at about the same distance but at slightly different angles, they can be separated if they are more than one beam width apart. Ambiguity sometimes occurs due to reception of echoes from targets beyond the range of interest and of second time-around echoes. This can be resolved by range gates that make radar insensitive to targets beyond the range of interest. The range ambiguity can also be resolved by filters that put limits on range."

The "laser was invented in 1960. Laser light differs from ordinary light in a few areas. The most important difference is that laser light is highly directional. The laser light travels as parallel beam and spreads very little. It can travel in very narrow beams. Laser light is also, electromagnetic waves. In comparison to microwave, laser light has higher frequency and shorter wavelength. Laser light can be used to measure speed and distance in the same way as the microwave radar.

For example, YAG (crystalline yttrium aluminum garnet) laser and ruby laser have been used as range finders. The YAG can emit very efficient and useful laser in the near infrared at 1.06 micrometer wavelength."

"Semiconductor junction lasers or diode lasers are very small, one millimeter or even smaller, typically, emitting about 10 milliwatts of power and can be produced inexpensively. A light-weight laser radar sensory device has been developed for use in special canes for the blind, with two or three Gallium Arsenide lasers. It is low-powered and its safety has been proven for outdoor and indoor daily living usage. Gallium arsenide laser is one example of the semiconductor lasers. The semiconductor lasers are usually very small, less than one millimeter in any direction. They can be easily assembled into compact arrays of many units. With heterostructure, gallium arsenide (GaAs) lasers can operate continuously in room temperature. The laser light can be modulated by varying the diode current. By alloying different proportions of two semiconductors, diode lasers can be fabricated to radiate at any wavelength from 0.64 to 32 micrometers. For example, the heterostructure of gallium indium arsenide phosphide sandwiched between layers of indium phosphide can radiate at 1.3 micrometers."

"The laser beams are highly directional. The laser receiving equipment are also highly directional. Since the laser receiving equipment will receive only the laser beams aimed at it, most interference can be avoided. This is an important advantage over the microwave radar. When there are multiple cars with the same laser radars at the same scene, their reflected signals will not interfere with each other. Confusion can be easily avoided."

The "laser gyroscope is the modern type of gyroscope with higher degree of accuracy, cheaper and much smaller than the traditional mechanical gyroscope. It can give directional information precisely. A typical laser gyroscope is made of glass-like material and is shaped like a triangle or a rectangle. A laser beam is generated and split into two parts that travel in opposite directions around the triangle or rectangle. Laser gyroscope has been used by airlines as automatic pilots to keep the airplanes on course. If the aircraft moves off course, the movement to one side will make one laser beam travel further than the other. Computer can analyze how much the laser beams are out of step and compute the plane's change in direction. Therefore, laser gyroscope can sense the rotation rate or direction change rate accurately."

"It is well known that laser beams are highly directional. For example, a beam of 1 inch in diameter may, at most, spread to only 3 inches after traveling one mile. Because the laser beam is highly directional and the beam width is very narrow, the scanning zone . . . can be easily controlled and be highly specific and selective."

In the Shaw invention, " . . . laser radars which emit electromagnetic waves in the infrared range or the far infrared range will be utilized. Laser lights do not penetrate rain, sandstorm, fog or snow, etc. as well as microwave radar. However, infrared light will penetrate rain, sandstorm, fog or snow better than the visible light. Therefore, the rain or snow, etc. will affect the driver's vision much more than they affect the infrared laser radar. If the rain or snow etc. are heavy enough, they may reduce the effective range of the laser radar. In this situation, the driver's vision will be affected even more such that the driver should slow down the car speed. With reduced car speed, the reduced range of laser radar can still serve its function."

"With highly directional character and with very small beam width, laser radars have other advantages as compared with microwave radars. The laser radar can easily avoid confusion caused by reflections from other laser radars in the vicinity. For microwave radars, reflected signals from adjacent vehicle with same or similar radar equipment can be received and become very confusing. Laser radars can avoid this disadvantage. The receiver of the laser radar is aimed at exactly the same direction as the associated transmitter. The receiver is also highly directional. The receiver will not receive the reflected back laser light emitted from other transmitters on the same vehicle or from transmitters on adjacent vehicles because ordinarily the other laser light reflection will come in a direction different from the receivers direction, with the following two very rare and brief exceptions. The first exception is that confusion may occur when an oncoming vehicle's laser beam happen to aim at the system-equipped vehicle's receiver. In two moving cars this situation will last at most only a minimal fraction of a second. A second exception is that confusion may occur when an adjacent vehicle's laser beam happens to illuminate at the same spot as the spot illuminated by the system-equipped vehicle's laser beam. Then the reflected laser light from the adjacent vehicle may come in the right direction for the system-equipped vehicle's receiver. Again, this situation should be very rare and should last for an extremely short period of time. Since these two situations are extremely rare and very brief, confusion and interference from adjacent vehicle's similar laser radar equipment virtually will not be a problem for laser radars in this invention."

Shaw, in these patents, relies on two laser radar systems in order to get an accurate prediction of the location of the vehicle on the roadway using triangulation. No image of vehicles or other objects on the roadway is formed. No attempt is made to identify the illuminated object. Shaw uses triangulation from two laser radars to obtain the relative velocity of the object being interrogated whereas in the instant invention, the motion over time of the object can be used to obtain its vector velocity.

U.S. Pat. No. 5,367,463 to Tsuji describes a vehicle azimuth determining system. It uses regression lines to find vehicle on map when there are errors in the GPS and map data. This patent does not give sub-meter accuracy. The advantage of this invention is that it shows a method of combining both map matching data and GPS along with a gyro and a vehicle velocity and odometer data to improve the overall location accuracy of the vehicle.

U.S. Pat. No. 5,383,127 to Shibata uses map matching algorithms to correct for errors in the GPS navigational system to provide a more accurate indication of where the vehicle is or, in particular, on what road the vehicle is. This procedure does not give sub-meter accuracy. Its main purpose is for navigation and, in particular, in determining the road on which the vehicle is traveling.

U.S. Pat. No. 5,416,712 to Geier, et al. relates generally to navigation systems and more specifically to global positioning systems that use dead reckoning apparatus to fill in as backup during periods of GPS shadowing such as occur amongst obstacles, e.g., tall buildings in large cities. This patent shows a method of optimally combining the information available from GPS even when less than 3 or 4 satellites are available with information from a low-cost, inertial gyro, having errors that range from 1–5%. This patent provides and excellent analysis of how to use a modified Kalman filter to optimally use the available information.

U.S. Pat. No. 5,463,384 to Juds uses a plurality of infrared beams to alert a truck driver that a vehicle is in his blind spot when he begins to turn the vehicle. The system is typically activated by the vehicle's turn signal. No attempt is made to measure exactly where the object is, only whether it is in the blind spot or not.

U.S. Pat. No. 5,467,072 to Michael relates to a phased array radar system that permits the steering of a radar beam without having to rotate antennas. Aside from that, it suffers from all the disadvantages of radar systems as described above. In particular, it is not capable of giving accurate three-dimensional measurements of an object on the roadway.

U.S. Pat. No. 5,479,173 to Yoshioka, et al. uses a steering angle sensor, a yaw rate sensor and a velocity of the vehicle sensor to predict the path that the vehicle will take. It uses a radar unit to identify various obstacles that may be in the path of the vehicle, and it uses a CCD camera to try to determine that the road is changing direction in front of the vehicle. No mention is made of the accuracy with which these determinations are made. It is unlikely that sub-meter accuracy is achieved.

U.S. Pat. No. 5,486,832 to Hulderman employs millimeter wave radar and optical techniques to eliminate the need for a mechanical scanning system. A 35-degree arc is illuminated in the azimuth direction and 6 degrees in elevation. The reflected waves are separated into sixteen independent, simultaneously overlapping 1.8 degree beams. Each beam, therefore, covers a width of about 3 feet at 100 feet distance from the vehicle, which is far too large to form an image of the object in the field of view. As a result, it is not possible to identify the objects in the field of view. All that is known is that an object exists; also no attempt has been made to determine whether the object is located on the roadway or not, therefore this invention suffers from the limitations of other radar systems.

U.S. Pat. No. 5,504,482 to Schreder discloses an automobile equipped with an inertial and satellite navigation system as well as a local area digitized street map. The main use of this patent is for route guidance in the presence of traffic jams, etc. This patent describes how information as to the state of the traffic on a highway can be transmitted and utilized by a properly equipped vehicle to change the route the driver would take in going to his destination. Nevertheless, this patent provides a good picture of the state of the art as can be seen from the following quoted paragraphs:

" . . . there exists a wide range of technologies that have disadvantageously not been applied in a comprehensive integrated manner to significantly improve route guidance, reduce pollution, improve vehicular control and increase safety associated with the common automobile experience. For example, it is known that gyro based inertial navigation systems have been used to generate three-dimensional position information, including exceedingly accurate acceleration and velocity information over a relatively short travel distance, and that GPS satellite positioning systems can provide three-dimensional vehicular positioning and epoch timing, with the inertial system being activated when satellite antenna reception is blocked during "drop out" for continuous precise positioning. It is also known that digitized terrain maps can be electronically correlated to current vehicular transient positions, as have been applied to military styled transports and weapons. For another example, it is also known that digitally encoded information is well suited to RF radio transmission within specific transmission carrier bands, and that automobiles have been adapted to received AM radio, FM radio, and cellular telecommunication RP transmissions. For yet another example, it is further known that automobile electronic processing has been adapted to automatically control braking, steering, suspension and engine operation, for example, anti-lock braking, four-wheel directional steering, dynamic suspension stiffening during turns and high a speed, engine governors limiting vehicular speed, and cruise control for maintaining a desired velocity. For still another example, traffic monitors, such as road embedded magnetic traffic light sensor loops and road surface traffic flow meters have been used to detect traffic flow conditions. While these sensors, meters, elements, systems and controls have served limited specific purposes, the prior art has disadvantageously failed to integrate them in a comprehensive fashion to provide a complete dynamic route guidance, dynamic vehicular control, and safety improvement system.

"Recently, certain experimental integrated vehicular dynamic guidance systems have been proposed. Motorola has disclosed an Intelligent Vehicle Highway System in block diagram form in copyright dated 1993 brochure. Delco Electronics has disclosed another Intelligent Vehicle Highway System also in block diagram form in Automotive News published on Apr. 12, 1993. These systems use compass technology for vehicular positioning. However, displacement wheel sensors are plagued by tire slippage, tire wear and are relatively inaccurate requiring recalibration of the current position. Compasses are inexpensive, but suffer from drifting particularly when driving on a straight road for extended periods. Compasses can sense turns, and the system may then be automatically recalibrated to the current position based upon sensing a turn and correlating that turn to the nearest turn on a digitized map, but such recalibration, is still prone to errors during excessive drifts. Moreover, digitized map systems with the compass and wheel sensor positioning methods operate in two dimensions on a three dimensional road terrain injecting further errors between the digitized map position and the current vehicular position due to a failure to sense distance traveled in the vertical dimension.

"These Intelligent Vehicle Highway Systems appear to use GPS satellite reception to enhance vehicular tracking on digitized road maps as part of a guidance and control system. These systems use GPS to determine when drift errors become excessive and to indicate that recalibration is necessary. However, the GPS reception is not used for automatic accurate recalibration of current vehicular positioning, even though C-MIGITS and like devices have been used for GPS positioning, inertial sensing and epoch time monitoring, which can provide accurate continuous positioning.

"These Intelligent Vehicle Highway Systems use the compass and wheel sensors for vehicular positioning for route guidance, but do not use accurate GPS and inertial route navigation and guidance and do not use inertial measuring units for dynamic vehicular control. Even though dynamic electronic vehicular control, for example, anti-lock braking, anti-skid steering, and electronic control suspension have been contemplated by others, these systems do not appear to functionally integrate these dynamic controls with an accurate inertial route guidance system having an inertial measuring unit well suited for dynamic motion sensing. There exists a need to further integrate and improve these guidance systems with dynamic vehicular control and with improved navigation in a more comprehensive system.

"These Intelligent Vehicle Highway Systems also use RP receivers to receive dynamic road condition information for dynamic route guidance, and contemplate infrastructure traffic monitoring, for example, a network for road magnetic sensing loops, and contemplate the RF broadcasting of dynamic traffic conditions for dynamic route guidance. The disclosed two-way RF communication through the use of a transceiver suggests a dedicated two-way RF radio data system. While two-way RF communication is possible, the flow of necessary information between the vehicles and central system appears to be exceedingly lopsided. The flow of information from the vehicles to a central traffic radio data control system may be far less than the required information from traffic radio data control system to the vehicles. It seems that the amount of broadcasted dynamic traffic flow information to the vehicles would be far greater than the information transmitted from the vehicles to the central traffic control center. For example, road side incident or accident emergency messages to a central system may occur far less than the occurrences of congested traffic points on a digitized map having a large number of road coordinate points.

"Conserving bandwidth capacity is an objective of RF communication systems. The utilization of existing infra structure telecommunications would seem cost-effective. AT&T has recently suggested improving the existing cellular communication network with high speed digital cellular communication capabilities. This would enable the use of cellular telecommunications for the purpose of transmitting digital information encoding the location of vehicular incidents and accidents. It then appears that a vehicular radio data system would be cost-effectively used for unidirectional broadcasting of traffic congestion information to the general traveling public, while using existing cellular telecommunication systems for transmitting emergency information. The communication system should be adapted for the expected volume of information. The Intelligent Vehicular Highway Systems disadvantageously suggest a required two-way RF radio data system. The vast amount of information that can be transmitted may tend to expand and completely occupy a dedicated frequency bandwidth. To the extent that any system is bidirectional in operation tends to disadvantageously require additional frequency bandwidth capacity and system complexity."

U.S. Pat. No. 5,506,584 to Boles relates to a system for communication between vehicles through a transmit and transponder relationship. The patent mentions that there may be as many as 90 vehicles within one half mile of an interrogation device in a multi-lane environment, where many of them may be at the same or nearly the same range. The Boles patent utilizes a transponder device, the coded responses which are randomized in time and an interrogation device which processes the return signals to provide vehicle identification speed, location and transponder status information on vehicles to an operator or for storage in memory. No mention is made of how a vehicle knows its location and therefore how it can transmit that location to other vehicles.

U.S. Pat. No. 5,530,447 to Henderson, et al. shows a system used to classify targets as threatening or non-threatening, depending on whether the target is moving relative to the ground. This system is only for vehicles in an adjacent lane and is primarily meant to protect against blind-spot type accidents. No estimation is made by the system of the position of the target vehicle or the threatening vehicle, only its relative velocity.

U.S. Pat. No. 5,530,651 to Uemura, et al. discloses a combination ultrasonic and laser radar optical detection system which has the feature that if the ability of the system to detect an obstacle decreases due to soiled lenses, rain, snow, etc., then the vehicle control system automatically limits the speed, for example, that the vehicle can travel in the adverse weather conditions. The speed of the vehicle is also reduced when the visibility ahead is reduced due to a blind, curved corner.

U.S. Pat. No. 5,540,298 to Yoshioka, et al. is primarily concerned with changing the suspension and steering characteristics of the vehicle in order to prevent unstable behavior of the vehicle in response to the need to exercise a collision avoidance maneuver. The collision anticipation system consists of an ultrasonic unit and two optical laser radar units.

U.S. Pat. No. 5,576,972 to Harrison provides a good background of how neural networks are used to identify various of objects. Although not directly related to intelligent transportation systems or o accident-avoidance systems such as described herein, these techniques will be applied to the invention described herein as discussed below.

U.S. Pat. No. 5,585,798 to Yoshioka, et al. uses a combination of a CCD camera and a laser radar unit. The invention attempts to make a judgement as to the danger of each of the many obstacles that are detected. The load on the central processor is monitored by looking at different obstacles with different frequencies depending on their danger to the present system. A similar arrangement is contemplated for the invention as disclosed herein.

U.S. Pat. No. 5,572,428 to Ishida is concerned with using a radar system plus a yawl rate sensor and a velocity sensor to determine whether a vehicle will collide with another vehicle based on the area occupied by each vehicle. Naturally, since radar cannot accurately determine this area it has to be assumed by the system.

U.S. Pat. No. 5,606,506 to Kyrtsos provides a good background of the GPS satellite system. It discloses a method for improving the accuracy of the GPS system using an inertial guidance system. This is based on the fact that the GPS signals used by Kyrtsos do not contain a differential correction and the selective access feature is on. Key paragraph from this application that is applicable to the instant invention follow.

"Several national governments, including the United States 7, (U.S.) of America, are presently developing a terrestrial position determination system, referred to generically as a global positioning system (GPS). A GPS is a satellite-based radio-navigation system that is intended to provide highly accurate three-dimensional position information to receivers at or near the surface of the Earth.

"The U.S. government has designated its GPS the "NAVSTAR." The NAVSTAR GPS is expected to be declared fully operational by the U.S. government in 1993. The government of the former Union of Soviet Socialist Republics (USSR) is engaged in the development of a GPS known as "GLONASS". Further, two European systems known as "NAVSTAR" and "GRANAS" are also under development. For ease of discussion, the following disclosure focuses specifically on the NAVSTAR GPS. The invention, however, has equal applicability to other global positioning systems.

"In the NAVSTAR GPS, it is envisioned that four orbiting GPS satellites will exist in each of six separate circular orbits to yield a total of twenty-four GPS satellites. Of these, 3' twenty-one will be operational and three will serve as spares. The satellite orbits will be neither polar nor equatorial but will lie in mutually orthogonal inclined planes.

"Each GPS satellite will orbit the Earth approximately once every 12 hours. This coupled with the fact that the 4 Earth rotates on its axis once every twenty-four hours causes each satellite to complete exactly two orbits while the Earth turns one revolution.

"The position of each satellite at any given time will be precisely known and will be continuously transmitted to the Earth. This position information, which indicates the position of the satellite in space with respect to time (GPS time), is known as ephemeris data.

"In addition to the ephemeris data, the navigation signal transmitted by each satellite includes a precise time at which the signal was transmitted. The distance or range from a receiver to each satellite may be determined using this time of transmission which is included in each navigation signal. By noting the time at which the signal was received at the receiver, a propagation time delay can be calculated. This time delay when multiplied by the speed of propagation of the signal will yield a "pseudorange" from the transmitting satellite to the receiver.

"The range is called a "pseudorange" because the receiver e clock may not be precisely synchronized to GPS time and because propagation through the atmosphere introduces delays into the navigation signal propagation times. These result, respectively, in a clock bias (error) and an atmospheric bias (error). Clock biases may be as large as several milliseconds.

"Using these two pieces of information (the ephemeris data and the pseudorange) from at least three satellites, the position of a receiver with respect to the center of the Earth can be determined using passive triangulation techniques.

"Triangulation involves three steps. First, the position of at least three satellites in "view" of the receiver must be determined. Second, the distance from the receiver to each satellite must be determined. Finally, the information from the first two steps is used to geometrically determine the position of the receiver with respect to the center of the Earth.

"Triangulation, using at least three of the orbiting GPS satellites, allows the absolute terrestrial position (longitude, latitude, and altitude with respect to the Earth's center) of any Earth receiver to be computed via simple geometric theory. The accuracy of the position estimate depends in part on the number of orbiting GPS satellites that are sampled. Using more GPS satellites in the computation can increase the accuracy of the terrestrial position estimate.

"Conventionally, four GPS satellites are sampled to determine each terrestrial position estimate. Three of the satellites are used for triangulation, and a fourth is added to correct for the clock bias described above. If the receiver's clock were precisely synchronized with that of the GPS satellites, then this fourth satellite would not be necessary. However, precise (e.g., atomic) clocks are expensive and are, therefore, not suitable for all applications.

"For a more detailed discussion on the NAVSTAR GPS, see Parkinson, Bradford W. and Gilbert, Stephen W., "NAVSTAR: Global Positioning System—Ten Years Later, "Proceedings of the IEEE, Vol. 71, No. 10, October 1983; and GPS: A Guide to the Next Utility, published by Trimble Navigation Ltd., Sunnyvale, Calif., 1989, pp. 147, both of which are incorporated herein by reference. For a detailed discussion of a vehicle positioning/navigation system which uses the NAVSTAR GPS, see commonly owned U.S. Pat. No. 5,555,503, entitled "Vehicle Position Determination System and Method," filed Dec. 3, 1990, which is incorporated herein by reference.

"The NAVSTAR GPS envisions two modes of modulation for the carrier wave using pseudorandom signals. In the first mode, the carrier is modulated by a "C/A signal" and is referred to as the "Coarse/Acquisition mode". The Coarse/Acquisition or C/A mode is also known as the "Standard50 Positioning Service". The second mode of modulation in the NAVSTAR GPS is commonly referred to as the "precise" or "protected" (P) mode. The P-mode is also known as the "Precise Positioning Service". The P-mode is intended for use only by Earth receivers specifically authorized by the United States government. Therefore, the P-mode sequences are held in secrecy and are not made publicly available. This forces most GPS users to rely solely on the data provided via the C/A mode of modulation (which results in a less accurate positioning system).

"Moreover, the U.S. government (the operator of the NAVSTAR GPS) may at certain times introduce errors into the C/A mode GPS data being transmitted from the GPS satellites by changing clock and/or ephemeris parameters. That is, the U.S. government can selectively corrupt the GPS data. The ephemeris and/or the clock parameters for one or more satellites may be slightly or substantially modified. This is known as "selective availability" or simply SA. SA may be activated for a variety of reasons, such as national security.

"When SA is activated, the U.S. government is still able to use the NAVSTAR GPS because the U.S. government has access to the P-mode modulation codes. The C/A mode data, however, may be rendered substantially less accurate.

"In addition to the clock error, the atmospheric error and errors from selective availability, other errors which affect GPS position computations include receiver noise, signal reflections, shading, and satellite path shifting (e.g., satellite wobble). These errors result in computation of incorrect pseudoranges and incorrect satellite positions. Incorrect pseudoranges and incorrect satellite positions, in turn, lead to a reduction in the precision of the position estimates computed by a vehicle positioning system."

U.S. Pat. No. 5,613,039 to Wang, et al. is a collision warning radar system utilizing a real time adaptive probabilistic neural network. Wang discloses that 60% of roadway collisions could be avoided if the operator of the vehicle was provided warning at least one-half second prior to a collision. The radar system used by Wang consists of two separate frequencies. The reflective radar signals are analyzed by a probabilistic neural network that provides an output signal indicative of the likelihood and threat of a collision with a particular object. The invention further includes a Fourier transform circuit that converts the digitized reflective signal from a time series to a frequency representation. It is important to note that in this case, as in the others above, true collision avoidance will not occur since, without a knowledge of the roadway, two vehicles can be approaching each other on a collision course, each following a curved lane on a highway and yet the risk of collision is minimal due to the fact that each vehicle remains in its lane. Thus, true collision avoidance cannot be obtained without an accurate knowledge of the road geometry.

U.S. Pat. No. 5,757,646 to Talbot, et al. illustrates the manner in which centimeter level accuracy on the fly in real time is obtained. It is accomplished by double differencing the code and carrier measurements from a pair of fixed and roving GPS receivers. This patent also presents and excellent discussion of the problem and of various prior solutions as in the following paragraphs:

"When originally conceived, the global positioning system (GPS) that was made operational by the United States Government was not foreseen as being able to provide centimeter-level position accuracies. Such accuracies are now commonplace.

"Extremely accurate GPS receivers depend on phase measurements of the radio carriers that they receive from various orbiting GPS satellites. Less accurate GPS receivers simply develop the pseudoranges to each visible satellite based on the time codes being sent. Within the granularity of a single time code, the carrier phase can be measured and used to compute range distance as a multiple of the fundamental carrier wavelength. GPS signal transmissions are on two synchronous, but separate carrier frequencies "L1" and "L2", with wavelengths of nineteen and twenty-four centimeters, espectively. Thus within nineteen or twenty-four centimeters, the phase of the GPS carrier signal will change 360°.

"However the numbs of whole cycle (360°) carrier phase shifts between a particular GPS satellite and the GPS receiver must be resolved. At the receiver, every cycle will appear the same. Therefore there is an "integer ambiguity". The computational resolution of the integer ambiguity has traditionally been an intensive arithmetic problem for the computers used to implement GPS receivers. The traditional approaches to such integer ambiguity resolution have prevented on-the-fly solution measurement updates for moving GPS receivers with centimeter accurate outputs. Very often such highly accurate GPS receivers have required long periods of motionlessness to produce a first and subsequent position fix.

"There are numerous prior art methods for resolving integer ambiguities. These include integer searches, multiple antennas, multiple GPS observables, motion-based approaches, and external aiding. Search techniques often require significant computation time and are vulnerable to erroneous solutions or when only a few satellites are visible. More antennas can improve reliability considerably. If carried to an extreme, a phased array of antennas results whereby the integers are completely unambiguous and searching is unnecessary. But for economy the minimum number of antennas required to quickly and unambiguously resolve the integers, even in the presence of noise, is preferred.

"One method for integer resolution is to make use of the other observables that modulate a GPS timer. The pseudorandom code can be used as a coarse indicator of differential range, although it is very susceptible to multipath problems. Differentiating the L1 and L2 carriers provides a longer effective wavelength, and reduces the search space. However dual frequency receivers are expensive because they are more complicated. Motion-based integer resolution methods make use of additional information provided by platform or satellite motion. But such motion may not always be present when it is needed."

This system is used in an industrial environment where the four antennas are relatively close to each other. Practicing the teachings of this invention permits a navigational computer to solve for the position of the rover to within a few centimeters on the fly ten times a second. An example is given where the rover is an airplane.

U.S. Pat. No. 5,767,953 to McEwan describes a laser tape measure for measuring distance. It is distinct from laser radars in that the width of the pulse is measured in sub-nanosecond times, whereas laser radars are typically in the microsecond range. The use of this technology in the current invention would permit a much higher scanning rate than by convention radar systems and thus provide the opportunity for obtaining an image of the obstructions on the highway. It is also less likely that multiple vehicles having the same system would interfere with each other. For example, if we wish to scan an area 20 feet by 5 feet with a 0.2 inch pixel size, this would give on the order of one million pixels. If using laser radar, one pixel per microsecond is sent out, it would take one second to scan the entire area during which time the vehicle has traveled 88 feet at 60 miles an hour. On the other hand, if scanning this array at 100 feet, it would take 200 nanoseconds for the light to travel to the obstacle and back. Therefore, if a pulse is sent out every fifth of a microsecond, it will take a fifth of a second to obtain a million pixels, during which time the vehicle has traveled about 17 feet. If 250,000 pixels are used, the vehicle will only have traveled 4 feet.

U.S. Pat. No. 5,361,070 to McEwan, although describing a motion detector, discloses technology which is used as part of a system to permit a vehicle to precisely know where it is on the face of the earth at particular locations. The ultra wideband 200 picosecond radar pulse emitted by the low power radar device of this invention is inherently a spread spectrum pulse which generally spans hundreds of megahertz to several gigahertz. A frequency allocation by the FCC is not relevant. Furthermore, many of these devices may be co-located without interference. The concept of this device is actually disclosed in various forms in the following related patents to McEwan. The following comments will apply to this group of patents as a group, all of which are incorporated herein by reference.

U.S. Pat. No. 5,510,802 to McEwan discloses a time of light radio location system similar to what is described below. In this case, however, a single transmitter sends out a pulse, which is received by three receivers to provide sub-millimeter resolution. The range of this device is less than 10 feet.

The concept disclosed in McEwan's U.S. Pat. No. 5,519,400 is that the MIR signal can be modulated with a coded sequence to permit positive identification of the sending device. In an additional McEwan patent, U.S. Pat. No. 5,589,838, a short-range radio location system is described. Additionally, in U.S. Pat. No. 5,774,091, McEwan claims that the MIR system will operate to 20 feet and give resolutions on the order of 0.01 inches.

Looking now at some of the relevant non-patent prior art:

Work has been done at JPL to develop a target recognition system. Neural networks pay a key role in that target recognition process. The recognition of vehicles on a roadway is a considerably simpler process. Through range gating, most of the cluttering information can be eliminated. The three-dimensional image obtained as described below will permit simple rotations of the image to artificially create a frontal view of the object being investigated. Also, the targets of interest here are considerably closer than was considered by JPL. Nevertheless, the techniques described in this reference and in the references cited by this reference, all of which are included in here by reference, are applicable here in a simplified form. The JPL study achieved over a 90% success rate at 60 frames per minute.

Significant additional improvement can be obtained for the WAAS system using the techniques described in the paper "Incorporation of orbital dynamics to improve wide-area differential GPS" by J. Ceva, W. Bertinger, R. Mullerschoen, T. Yunck and B. Parkinson, Institute of Navigation meeting on GPS technology, Palm Springs, Calif., September 1995), which is included herein by reference.

The ALVINN project of Carnegie Mellon University (Jochem, Todd M., Pomerlean, Dean A., and Thorpe, Charles E. "Vision-Based Neural Network Road and Intersection Detection and Traversal, "IEEE Conference on Intelligent Robots and Systems, Aug. 5–9, 1995, Pittsburgh, Pa., USA) describes an autonomous land vehicle using a neural network. The neural network is trained based on how a driver drives the vehicle given the output from a video camera. The output of the neural network is the direction that the vehicle should head based on the input information from the video camera and the training based on what a good driver would have done. Such a system can be used in the present invention to guide a vehicle to a safe stop in the event that the driver becomes incapacitated or some other emergency situation occurs wherein the driver is unable to control the vehicle. The input to the neural network in this case would be the map information rather than a video camera. Additionally, the laser radar imaging system could also be an input to the system. This neural network system could also take over in the event that an accident becomes inevitable.

The DGPS correction information can be broadcast over the radio data system (RDS) via FM transmitters for land use. A company called Differential Correction, Inc. has come up with a technique to transmit this DGPS information on the RDS channel. This technique has been used in Europe since 1994 and in particular, Sweden has launched a nation-wide DPGS service via the RDS (see, Sjoberg, Lars, "A '1 Meter' Satellite Based Navigation Solutions for the Mobile Environment That Already Are Available Throughout Europe"). This system has the potential of providing accuracies on the premium service of between 1 and 2 meters. A 1 meter accuracy, coupled with the carrier phase system to be described below, provides an accuracy substantially better than 1 meter as required by the Road to Zero Fatalities (RtZF™™) system of this invention.

In addition to the FM RDS system, the following other systems can be used to broadcast DGPS correction data: cellular mobile phones, satellite mobile phones, MCA (multi-channel access), wireless tele-terminals, DARCs/RBDS (radio data systems/radio broadcast data system), type FM sub-carrier, exclusive wireless, and pagers. In particular, DARC type is used for vehicle information and communication systems so that its hardware can be shared. Alternately, the cellular phone system, coupled with the Internet, could be used for transmitting corrections (see, Ito, Toru and Nishiguchi, Hiroshi entitled "Development of DGPS using FM Sub-Carrier For ITS") with the exception of the Internet comment.

One approach for the cellular system is to use the GSM mobile telephone system, which is the Europe-wide standard. This can be used for transmitting DGPS and possibly map update information (see, Hob, A., Ilg, J. and Hampel, A. entitled "Integration Potential Of Traffic Telematics).

A paper by Amamoto, Naohiro and Matsumoto, Koji entitled "Obstruction Detector By Environmental Adaptive Background Image Updating" describes a method of distinguishing between moving object pixels, stationary object pixels, and pixels that change due to illumination changes in a video image. This paper appears to handle the case of a camera fixed relative to the earth, not one mounted on a vehicle. This allows the system to distinguish between a congested area and an area where cars are moving freely. The video sampling rate was 100 milliseconds.

A paper by Miyata, Yasuhiro and Otomo, Katsuya, Kato, Haijime, Imacho, Nobuhiro, Murata, Shigeo, entitled "Development Of Road Icing Prediction System" describes a method of predicting road icing conditions several hours in advance based on an optical fiber sensor laid underneath the road and the weather forecast data of that area.

There is likely a better way of determining ice on the road than described in this paper. The reflection of an infrared off the road has to vary significantly depending on whether there is ice on the road or snow, or the road is wet or dry. An unsupervised neural network could be a better solution. The system of this paper measures the road surface temperature, air temperature and solar radiation. A combination of active and passive infrared would probably be sufficient. Perhaps a specially designed reflective surface could be used on the road surface in an area where it is not going to be affected by traffic.

What this paper showed is that if the proper algorithm is used, the actual road temperature can be predicted without the need to measure the temperature on the road. This implies that icing conditions can be predicted and the sensors would not be necessary. Once again, perhaps a neural network algorithm that monitors a particular section of road and compares it to the forecasted data would be all that is required. In other words, given certain meteorological data, the neural network ought to be able to determine that the probability is of icing. What is needed, therefore, is to pick a section of roadway and monitor that roadway with a state-owned vehicle throughout the time period when icing is likely to occur and determine if icing has occurred and compare that with the meteorological data using a neural network that is adapted for each section of road.

A paper by Min, Joon, Cho, Hyang, and Choi, Jong, entitled "A Learning Algorithm Using Parallel Neuron Model" describes a method of accurately categorizing vehicles based on the loop in the highway. This system uses a form of neural network, but not a back propagation neural network. This would essentially be categorizing a vehicle by its magnetic signature. Much information is lost in this system because of the lack of knowledge of the vehicle's velocity.

A paper by Doi, Ayumu, Yamamomo, Yasunori, and Butsuen, Tetsuro entitled "Development Of Collision Warning System And Its Collision Avoidance Effect" describes a collision warning system that has twice the accuracy of conventional systems. It uses scanning laser radar. In the system described in this paper, the authors do not appear to use range gating to separate one vehicle from another.

In Choi, Jong and Kim, Hoi, "An Interim Report: Building A Wireless Internet-Based Traveler's Information System As A Replacement Of Car Navigation Systems", a system of showing congestion at intersections is broadcast to the vehicle through the Internet. The use of satellites is disclosed as well as VCS system.

Another example of the use of the Internet to provide highway users with up-to-date traffic congestion information. Nowhere in this example, is the Internet used to transmit map information.

A paper by Sheu, Dennis, Liaw, Jeff and Oshizawa, Al, entitled "A Communication System For In-Vehicle Navigation System" provides another description of the use of the Internet for real traffic information. However, the author unnecessarily complicates matters by using push technology which isn't necessary and with the belief that the Internet connection would have to be stopped which, of course, is not the case. For example, looking at the @home network where everyone on the network is connected all the time.

Consider placing a requirement that all vehicles have passive transponders. This could be part of the registration system for the vehicle and, in fact, could even be part of the license plate. This is somewhat disclosed in a paper by Shladover, Steven entitled "Cooperative Advanced Vehicle Control and Safety Systems (AVCSS)". This paper discusses advanced vehicle control and safety systems (AVCSS). AVCSS sensors will make it easy to detect the presence, location and identity of all other vehicles in their vicinity. Passive radio frequency transponders are disclosed. The use of differential GPS with accuracies as good as about two (2) centimeters, coupled with an inertial guidance system, is disclosed, as is the ability of vehicles to communicate their locations to other vehicles. It discloses the use of accurate maps, but not of lateral vehicle control using these maps. It is obvious from reading this paper that the author did not contemplate the safety system aspects of using accurate maps and accurate GPS. In fact, the author stresses the importance of cooperation between various government levels and agencies and the private sector in order to make AVCSS feasible. "Automotive suppliers cannot sell infrastructure -dependent systems to their customers until the very large majority of the infrastructure is suitable equipped."

A paper by Rick Schuman entitled "Progress Towards Implementing Interoperable DSRC Systems In North America" describes the standards for dedicated short-range communications (DSRC). DSRC could be used for inter-vehicle communications, however, its range according to the ITS proposal to the Federal Government would be limited to about 90 meters. Also, there may be a problem with interference from toll collection systems, etc. According to this reference, however, "it is likely that any widespread deployment of intersection collision avoidance or automated highways would utilize DSRC". DSRC physical layer uses microwaves in the 902 to 928 megahertz band. However, ITS America submitted a petition to the FCC seeking to use the 5.85 to 5.925 gigahertz band for DSRC applications.

It is pointed out that when the operator begins operating his vehicle, he will not be near a reference point as determined by the MIR locator system. In this situation, he will use the standard GPS system with the WAAS corrections. This will provide accuracy of a few meters. This accuracy might be improved as he travels down the road through map-matching. The vehicle will know, however, that is not operating in the super accurate mode. As soon as the vehicle passes and MRI system, it will then be able to calculate exactly where it is within centimeters and the vehicle will know that it is in the accurate mode. Naturally, any travel on a controlled highway would require frequent MRI stations and the vehicle can be accurately contained within its proper corridors. Also, the size of the corridors that the vehicle is permitted in can be a function of the accuracy state of the vehicle.

A paper by O'Shea, Michael and Shuman, Valerie entitled "Looking Ahead: Map Databases in Predictive Positioning and Safety Systems discusses map databases which can assist radar and image-processing systems of this invention since the equipped vehicle would know where the road ahead is and can therefore distinguish the lane that the preceding vehicle is in. No mention, however, is made in this reference of how this is accomplished through range gating. This reference also mentions that within five years it may be possible to provide real time vehicle location information of one meter accuracy. However, it mentions that this will be limited to control access roads such as interstate highways. In other words, the general use of this information on all kinds of roads for safety purposes is not contemplated. This reference also states that "road geometry, for example, may have to be accurate to within one meter or less as compared to the best available accuracy of 15 meters today". This reference also mentions the information about lane configuration that can be part of the database including the width of each lane, the number of lanes, etc. and that this can be used to determine driver drowsiness. This reference also states that "at normal vehicle speeds, the vehicle location must be updated every few milliseconds. It is also stated that the combination of radar and map data can also help to interpret radar information such as the situation where a radar system describes an overpass as a semi truck . . . " Image processing in this Reference is limited to assessing road conditions such as rain, snow, etc. The use of a laser radar system is not contemplated by this reference. The use of this information for road departures warnings is also mentioned, as is lane following. The Reference also mentions that feedback from vehicles can be used to improve map configurations.

A paper entitled "Precursor Systems Analyses of Automated Highway Systems (Executive Summary)" discloses that "an AHS (automated highway system) can double or triple the efficiency of today's most congested lanes while significantly increasing safety and trip quality".

A paper entitled "Intelligent Transportation Infrastructure Benefits: Expected And Experienced" provides a summary of costs and benefits associated with very modest ITS implementations. Although a complete cost benefit analysis has not been conducted on the instant invention, it is evident from reading this reference that the benefits to cost reference will be a very large number.

According to this paper the congestion in the United States is increasing at about 9% per year. In 50 metropolitan areas the cost in 1992 was estimated at 48 billion dollars and in Washington, DC it represented an annual cost of $822 per person, or $1,580 per registered vehicle. In 1993, there were 40,115 people killed and 3 million injured in traffic accidents. Sixty-one percent (61%) of all fatal accidents occurred in rural areas. This reference lists the 29 user services that make up the ITS program. It is interesting that the instant invention provides 24 of the 29 listed user services.

This reference further goes into considerable discussion on various means of communication between a vehicle and other vehicles as well as the infrastructure. However, no recommendations are made for vehicle-to-vehicle communication technologies.

A version of CDPD, which is a commercially available mobile, wireless data network operated in the packet-switching mode, extends Internet protocol capabilities to cellular channels. This is reported on in a paper entitled "Intelligent Transportation Systems (ITS) Opportunity".

According to a paper by Kelly, Robert, Povich, Doublas and Poole, Katherine entitled "Petition of Intelligent Transportation Society of America for Amendment Of The Commission's Rules to Add Intelligent Transportation Services (ITS) As A New Mobile Service With Co-Primary Status In The 5.850 To 5.925 GHz", from 1989 to 1993, police received an annual average of over 6.25 million vehicle accident reports. During this same period the total comprehensive cost to the nation of motor vehicle accidents exceeded the annual average of 400 billion dollars. In 1987 alone Americans lost over 2 billion hours (approximately 22,800 years) sitting in traffic jams. Each driver in Washington D.C. wastes an average of 70 hours per year idling in traffic. Since 1986 car travel has increased almost 40%—that's in 10 years, which amounts to about a 3.4% increase per year.

Further, from Kelly et al., the FCC has allocated in Docket 94-124, 46.7 to 46.9 GHz and 76 to 77 GHz bands for unlicensed vehicular collision avoidance radar. The petition for DSRC calls for a range of up to 50 meters. This would not be sufficient for the RtZF™ system. For example, take the case of a car passing another car at 150 kilometers per hour. Fifty meters amounts to about one second, which would be insufficient time for the passing vehicle to complete the passing and return to the safe lane. Something more in the order of 500 meters would be more appropriate. This, however, may interfere with other uses of DSRC such as automatic toll taking, etc., thus DSRC may not be the optimum communication system for communication between vehicles. DSRC is expected to operate at a data rate of approximately 600 kbps. DSRC is expected to use channels that are six megahertz wide. It might be possible to allocate one or more of the six megahertz channels to RtZF™.

On DSRC Executive Roundtable—Meeting Summary, Appendix I—Proposed Changes to FCC Regulations covering the proposed changes to the FCC regulations, it is stated that " . . . DSRCS systems utilize non-voice radio techniques to transfer data over short distances between roadside and mobile units, between mobile units and between portable and mobile units to perform operations related to the improvement of traffic flow, traffic safety and other intelligent transportation service applications . . . ", etc.

There are one million, sixty-nine thousand, twenty-two miles of paved non-local roads in the US. Eight hundred twenty-one thousand and four miles of these are classified as "rural" and the remaining two hundred forty-eight thousand, eighteen miles are "urban".

The existing interstate freeway system consists of approximately 50,000 miles which is 1% of the 3.8 million miles of roads. Freeways make up 3% of the total urban/suburban arterial mileage and carry approximately 30% of the total traffic.

In one study, dynamic route guidance systems were targeting at reducing travel time of the users by 4%. Under the system of this invention, the travel times would all be known and independent of congestion once a vehicle had entered the system. Under the other system, the dynamic delays can change measurably after a vehicle is committed to a specific route. According to the Federal Highway Administration Intelligent Transportation Systems (ITS Field Operational Test), dynamic route guidance systems have not been successful.

There are several systems presented in the Federal Highway Administration Intelligent Transportation Systems (ITS Field Operational Test) for giving traffic information through commuters, called "Advance Traveler Information System" (ATIS). In none of these articles does it discuss the variation in travel time during rush hour for example, from one day to the next. The variability in this travel time would have to be significant to justify such a system. Naturally a system of this type would be unnecessary in situations where the instant invention has been deployed. The single most important cause of variability from day to day would be traffic incidents such as accidents, which are eliminated in the instant invention. One of the conclusions in a study published in the Federal Highway Administration Intelligent Transportation Systems (ITS Field Operational Test) titled "Direct Information Radio using Experimental Communication Technologies" was that drivers did not feel that the system was a significant over commercial radio traffic information. They did think the system was an improvement over television traffic information and changeable message signs. The drivers surveyed on average having changed their route only one time in the eight week test period due to information they received from the system.

A paper by Han, Shaowei entitled Ambiguity Recovery For Long-Range GPS Kinematic Positioning appears to say that if a mobile receiver is initially synchronized with a fixed receiver such that there is no integer ambiguity, and if the mobile receiver then travels away from the fixed receiver, and during the process it loses contact with the satellites for a period of up to five minutes, that the carrier phase ambiguity can be recovered or eliminated, providing again centimeter-type accuracies. Presumably the fixed station is providing the differential corrections.

A great flow of commercially available data will begin with the new generation of high resolution (as fine as 1 meter) commercial earth imaging satellites from companies like EarthWatch and SPOT Image. Sophisticated imaging software is being put in place to automatically process these imaging streams into useful data products.

The map database of the instant invention will conform to the open GIS specification. This will permit such devices to obtain on-line consumer information services such as driving advisories, digital yellow pages that give directions, local weather pictures and forecasts and video games that display local terrain.

Singh, Daljit and Grewal, Harkirat, "Autonomous Vehicle using WADGPS" discussed ground vehicle automation using wide-area DGPS. Though this reference describes many of the features of the present invention, it does not disclose sub-meter accuracy or sub-meter accurate mapping.

O'Connor, Michael, Bell, Thomas, Elkaim, Gabriel and Parkinson, Bradford, "Automatic Steering of Farm Vehicles Using GPS" describes an automatic steering system for farm vehicles where the vehicle lateral position error never deviated by more than 10 centimeters, using a carrier phase differential GPS system whereby the differential station was nearby.

Pullen, Samuel, Enge, Per and Parkinson, Bradford, "Simulation-Based Evaluation of WAAS Performance: Risk and Integrity Factors" discusses the accuracy that can be expected from the WAAS system. This paper indicates that the standard deviation for WAAS is approximately 1 meter. To get more accurate results requires more closely spaced differential stations. Using DGPS stations within 1,500 kilometer from the vehicle, high accuracy receivers can within 3 meters accuracy for DGPS.

J. Wu and S. G. Lin, "Kinematic Positioning with GPS Carrier Pahses by Two Types of Wide Laning", Journal of the Institute of Navigation, Vol. 44, No. 4, Winter 1997–1998 the solution of the integer ambiguity problem can be simplified by performing other constructs other than the difference between the two phases. One example is to use three times one phase angle, subtracted from four times another phase angle. This gives a wavelength of 162.8 centimeters vs. 86.2 for the single difference. Preliminary results with a 20-kilometer base line show a success rate as high as 95% for centimeter level accuracies.

J. F. Zunberge, M. M. Watkins and F. H. Webb, "Characteristics and Applications of Precise GPS Clock Solutions Every 30 Seconds", Journal of the Institute of Navigation, Vol. 44, No. 4, Winter 1997–1998. It appears that using the techniques described in this reference that the WAAS system could eventually be improved to provide accuracies in the sub-decimeter range for moving vehicles without the need for differential GDPS even with selective access on. This data would be provided every 30 seconds.

The clock dithering aspect of SA results in GPS satellite clock errors that vary by 24 meters RMS over time scales longer than a few hundred seconds. The solution of this reference may require that an accurate clock be based in the vehicle.

R. Braff, "Description of the FAA's Local Area Augmentation System (LAAS)", Journal of the Institute of Navigation, Vol. 44, No. 4, Winter 1997–1998. The LAAS System is the FAA's ground-based augmentation system for local area differential GPS. It is based on providing corrections of errors that are common to both ground-based and aircraft receivers. These corrections are transmitted to the user receivers via very high frequency VHF, line of sight radio broadcast. LAAS has the capability of providing accuracy on the order of 1 meter or better on the final approach segment and through rollout. LAAS broadcasts navigational information in a localized service volume within approximately 30 nautical miles of the LAAS ground segment.

W. I. Bertiger et al., "A Real-Time Wide Area Differential GPS System", Journal of the Institute of Navigation, Vol. 44, No. 4, Winter 1997–1998. This paper describes the software that is to be used with the WAAS System. The WAAS System is to be completed by the year 2001. The goal of the research described in this paper is to achieve sub-decimeter accuracies worldwide, effectively equaling local area DGPS performance worldwide. The full computation done on a Windows NT computer adds only about 3 milliseconds. The positioning accuracy is approximately 25 centimeters in the horizontal direction. That is the RMS value so that gives an error at ±3 sigma of 1.5 meters. Thus, the real time wide area differential GPS system is not sufficiently accurate for the purposes of this invention.

Y. M. Al-Haifi et al., "Performance Evaluation of GPS Single-Epoch On-theFly Ambiguity Resolution", Journal of the Institute of Navigation, Vol. 44, No. 4, Winter 1997–1998. "Performance evaluation of GPS single epoch on the fly ambiguity resolution." This technique demonstrates sub-centimeter precision results all of the time provided that at least five satellites are available and multipath errors are small. A resolution of 0.001 cycles is not at all unusual for geodetic GPS receivers. This leads to a resolution on the order of 0.2 millimeters. In practice, multipath affects, usually from nearby surfaces, limit the accuracy achievable to around 5 millimeters. It is currently the case that the reference receiver can be located within a few kilometers of the mobile receiver. In this case most of the other GPS error sources are common. The only major problem, which needs to be solved to carry out high precision kinematic GPS, is the integer ambiguity problem. This is because at any given instant the whole number of cycles between the satellite and the receiver is unknown. The recovery of the unknown whole wavelengths or integer ambiguities is therefore of great importance to precise phase positioning. Recently, a large amount of research has focused on so called on the fly (OTF) ambiguity resolution methodologies in which the integer ambiguities are solved for while the unknown receiver is in motion.

The half second processing time required for Y. M. Al-Haifi et al. represents 44 feet of motion which would be intolerable. The basic guidance system in this case would have to be the laser gyro on the vehicle. With faster PC, one-tenth a second processing time would be achievable, corresponding to approximately 10 feet of motion of the vehicle, putting less reliance on the laser gyroscope. Nowhere in Y. M. Al-Haifi et al. is the use of this system on automobiles suggested. The technique presented in this paper is a single epoch basis (OTF) ambiguity resolution procedure that is insensitive to cycle slips. This system requires the use of five or more satellites which suggests that additional GPS satellites may be launched to make the smart highway system more accurate.

Al Gore, "The Digital Earth:Understanding our Planet in the 21$^{st}$ Century", California Science Center, Jan. 31, 1998. The Administration has licensed commercial satellites that will provide one meter resolution imaging beginning in 1998. Such imaging can be combined with digital highway maps to provide an accuracy and reality check.

F. van Digglelen, "GPS and GPS+GLONASS RTK", ION-GPS, September 1997 "New Products Descriptions" gives a good background of real time kinematic systems using the carrier frequency. The products described in this paper illustrate the availability of centimeter level accuracies for the purposes of the RtZF™ system. The product described in F. van Diggelen requires a base station that is no further than 20 kilometers away.

R. C. Hayward et al., "Inertially Aided GPS Based Attitude Heading Reference System (AHRS) for General Aviation Aircraft" provides the list of a series of inertial sensors.

S. Malys et al., "The GPS Accuracy Improvement Initiative" provides a good discussion of the errors inherent in the GPS system without using differential corrections. It is there reported that the standard GPS provides a 9 meter RMS 3-D navigational accuracy to authorize precise positioning service users. The PPS clock states are those which are free of the effects of selective availability. This reference indicates that there are improvements planned in the GPS system that will further enhance its accuracy, at least for PPS users. The accuracies of these satellites independently of the accuracies of receiving units is expected to be between 1 and 1.5 meters RMS. Over the past eight years of GPS operations, a 50% (4.6 meter to 2.3 meter) PPS performance improvement has been observed for the signal in space range errors. This, of course, is the RMS error. The enhancements contained in the accuracy improvement initiative will provide another incremental improvement from the current 2.3 meters to 1.3 meters and perhaps to as low as 40 centimeters.

K. Ghassemi et al., "Performance Projections of GPS IIF" describes the performance objectives for a new class of GPS 2F satellites to be launched in late 2001.

1.3 Limitations of the Prior Art

Previous inventions have attempted to solve the collision avoidance problem for each vehicle independently of the other vehicles on the roadway. Systems that predict vehicle trajectories fail because two vehicles can be on a collision course and within the last 0.1 second a slight change of direction avoids the collision. This is a common occurrence that depends on the actions of the individual drivers and no collision avoidance system now in existence can differentiate this case from an actual collision. In the present invention, every equipped vehicle will be confined to a corridor and to a position within that corridor where the corridor depends on sub-meter accurate digital maps. Only if that vehicle deviates from the corridor will an alarm sound or the vehicle control system take over control of the vehicle sufficiently to prevent the vehicle from leaving its corridor if an accident would result from the departure from that corridor.

Additionally, no prior art system has successfully used the GPS navigational system, or an augmented DGPS to locate a vehicle on a roadway with sufficient accuracy that that information can be used to prevent the equipped vehicle from leaving the roadway or striking another similarly equipped vehicle.

Prior art systems in addition to being poor at locating potential hazards on the roadway, have not been able to ascertain whether they are in fact on the roadway of off on the side, whether they are threatening vehicles, static signs over overpasses etc. In fact no credible attempt to date has been made to identify or categorize objects which may impact the subject vehicle.

1.4 Summary and Objects of the Invention

The first phase of this invention can be practiced with only minor retrofit type additions to the vehicle. These include the addition of a differential GPS system and an accurate map database. In this first phase the driver will only be warned when he or she is about to depart from the road surface. During the second phase of practicing this invention, the earning system will be augmented with a system which will prevent the operator from leaving the assigned corridor and in particular leaving the road at high speed. In further phases of the implementation of this invention, additional systems will be integrated which will scan the roadway and act to prevent accidents with vehicles that do not have the system installed. Also communication systems will be added to permit the subject vehicle to communicate its position, velocity etc. to other nearby vehicles which are also equipped with a system.

A primary preferred embodiment of the system, therefore, is to equip a vehicle with a DGPS system, an laser gyro inertial guidance system, vehicle steering and brake control apparatus, a sub-meter accurate digital map system with the relevant maps, a scanning sub-nanosecond pulsed infrared laser radar, a system for sensing or receiving signals from a highway based precise position determination system, and communications systems for (1) sending and receiving data from similarly equipped vehicles, (2) receiving updated maps and map status information, and (3) receiving weather and road condition information. A preferred embodiment for the infrastructure enhancements includes a DGPS system, a micropower impulse radar precise position determining system and local weather and road condition determination and transmission system.

This invention is a method and apparatus for preventing vehicle accidents. A vehicle is equipped with a differential GPS (DGPS) navigational system as well as an inertial navigation subsystem. Part of the system can be an array of infrastructure stations that permit the vehicle to exactly determine its position at various points along its path. Such stations would typically be located at intervals such as every 50 miles along the roadway, or more or less frequently depending on requirements as described below. These stations permit the vehicle to become its own DGPS station and thus to correct for the GPS errors and to set the position of the vehicle based initial guidance system. It also provides sufficient information for the vehicle to use the carrier frequency to determine its absolute position to within less than a meter. Data is also available to the vehicle that provides information as to the edges of the roadway at the location of the vehicle so that the vehicle control system can continuously determine its location relative to the roadway edges. In the initial implementation, the operator operates his or her vehicle and is unaware of the presence of the accident avoidance system. If, however, the operator falls asleep or for some other reason attempts to run off of the roadway at high speed, the system will detect that the vehicle is approaching an edge of the roadway and will either sound an alarm or prevent the vehicle from leaving the roadway when doing so would lead to an accident. In some cases the system will automatically reduce the speed of the vehicle and stop it on the shoulder of the roadway.

It is important to note that the invention as described in the above paragraph is in itself a significant improvement to automotive safety. Approximately half of all fatal accidents involve only a single vehicle that typically leaves the roadway and impacts with a roadside obstacle. This typically happens when the driver in under the influence of alcohol or drugs, has a medical emergency or simply falls asleep. If this cause of accidents could be eliminated, the potential exists for saving many thousands of deaths per year when all vehicles are equipped with the system of this invention. This would make this the single greatest advance in automotive safety surpassing both seatbelts and airbags in lifesaving potential.

A first improvement to the basic invention is to provide the vehicle with a means using radar, lidar, optical or infrared imaging, or a similar technology, to determine the presence, location and velocity of other vehicles on the roadway which are not equipped with the accident avoidance system. The accident avoidance system (RtZF™) of this invention will not be able to avoid all accidents with such vehicles for the reasons discussed above, but will be able to provide the level of protection at least equal to the prior art systems. Some improvement over prior art systems will result from the fact that the equipped vehicle knows the location of the roadway edges, as well as the lane boundaries, not only at the location of the equipped vehicle but also at the location of the other nearby vehicles. Thus, the equipped vehicle will be able to determine that an adjacent vehicle has already left its corridor and warn the driver or initiate evasive action. In prior art systems, the location of the roadway is not known leading to significantly less discrimination ability.

A second improvement to the RtZF™ of this invention is to provide communication ability to other nearby similarly equipped vehicles permitting the continuous transmission and reception of the locations of all equipped vehicles in the vicinity. With each vehicle knowing the location, and thus the velocity, of all potential impacting vehicles which are equipped with the RtZF™, collisions between vehicles can be reduced and eventually nearly eliminated when all vehicles are equipped with the RtZF™.

A third improvement comprises the addition of software to the system that permits vehicles on especially designated vehicle corridors for the operator to relinquish control of the vehicle to the vehicle based system, and perhaps to a roadway computer system. This then permits vehicles to travel at high speeds in a close packed formation thereby substantially increasing the flow rate of vehicles on a given roadway. Naturally, in order to enter the designated corridors, a vehicle would be required to be equipped with the RtZF™. Similarly, this then provides an incentive to vehicle owners to have their vehicles so equipped so that they can enter the controlled corridors and thereby shorten their travel time.

Prior art systems require expensive modifications to highways to permit such controlled high speed close packed travel. Such modifications also require a substantial infrastructure to support the system. The RtZF™ of the present invention, in its simplest form, does not require any modification to the roadway but rather relies primarily on the GPS or similar satellite system. The edge and lane boundary information is either present within the vehicle RtZF™ memory or transmitted to the vehicle as it travels along the road. The permitted speed of travel is also communicated to the vehicles on the restricted corridor and thus each vehicle travels at the appointed speed. Since each vehicle knows the location of all other vehicles in the vicinity, should one vehicle slow down, due to an engine malfunction, for example, appropriate action can be taken to avoid an accident. Vehicles do not need to travel in groups as suggested and required by some prior art systems. Rather, each vehicle may independently enter the corridor and travel at the system defined speed until it leaves.

Another improvement involves the transmission of additional data concerning weather conditions, traffic accidents etc. to the equipped vehicle so that the speed of that vehicle can be limited to a safe speed depending on road conditions, for example. If moisture is present on the roadway and the temperature is dropping to the point that ice might be building up on the road surface, the vehicle can be notified by the roadway information system and prevented from traveling at an unsafe speed.

Principle objectives and advantages of the RtZF™ system of this invention include:

1. To provide a system based partially on the global positioning system (GPS) or equivalent that permits an onboard electronic system to determine the position of a vehicle with an accuracy of 1 meter or better.
2. To provide a system which permits an onboard electronic system to determine the position of the edges and/or lane boundaries of a roadway with an accuracy of 1 meter or less in the vicinity of the vehicle.
3. To provide a system which permits an onboard vehicle electronic system to determine the position of the edges and/or lane boundaries of a roadway relative to the vehicle with an accuracy of less than 2 meters.
4. To provide a system that substantially reduces the incidence of single vehicle accidents caused by the vehicle inappropriately leaving the roadway at high speed.
5. To provide a system which does not require modification to a roadway which permits high speed controlled travel of vehicles on the roadway thereby increasing the vehicle flow rate on congested roads.
6. To provide a collision avoidance system comprising a sensing system responsive to the presence of at least one other vehicle in the vicinity of the equipped vehicle and means to determine the location of the other vehicle relative to the lane boundaries of the roadway and thereby determine if the other vehicle has strayed from its proper position on the highway thereby increasing the risk of a collision, and taking appropriate action to reduce that risk.
7. To provide a means whereby vehicles near each other can communicate their position and/or their velocity to each other and thereby reduce the risk of a collision.
8. To provide a means for accurate maps of a roadway can be transmitted to a vehicle on the roadway.
9. To provide a means for weather, road condition and/or similar information can be communicated to a vehicle traveling on a roadway plus means within the vehicle for using that information to reduce the risk of an accident.
10. To provide a means and apparatus for a vehicle to precisely know its location at certain positions on a road by passing through or over an infrastructure based local subsystem thereby permitting the vehicle electronic systems to self correct for the satellite errors making the vehicle for a brief period its own DGPS station.
11. To utilize government operated navigation aid systems such as the WAAS and LARS as well as other available or to become available systems to achieve sub-meter vehicle location accuracies.
12. To utilize the OpenGIS™ map database structure so as to promote open systems for accurate maps for the RtZF™ system.

In contrast to some prior art systems, with the RtZF™ system of this invention, especially when all vehicles are appropriately equipped, automatic braking of the vehicle should rarely be necessary and steering and engine control should in most cases be sufficient to prevent accidents. In most cases, braking means the accident wasn't anticipated.

It is important to understand that this is a process control problem. The process is designed so that it should not fail and thus all accidents should be eliminated. Events that are troublesome to the system include a deer running in front of the vehicle, a box falling off of a truck, a rock rolling onto the roadway and a catastrophic failure of a vehicle. Continuous improvement to the process is thus required before these events are substantially eliminated. Each individual driver is part of the system and upon observing that such an event has occurred he or she should have the option of stopping the process to prevent or mitigate an emergency. All equipped vehicles therefore have the capability of communicating that the process is stopped and therefore that the vehicle speed, for example, should be substantially reduced until the vehicle has passed the troubled spot or until the problem ceases to exist. In other words, each driver is part of the process.

The RtZF™ system of this invention will thus start simple by reducing single vehicle accidents and evolve. The system has the capability to solve the entire problem by eliminating automobile accidents.

This invention is a method and apparatus for eliminating accidents by accurately determining the position of a vehicle, accurately knowing the position of the road and communicating between vehicles and vehicle and the infrastructure. People get into accidents when they go too fast for the conditions and when they get out of their corridor. This invention eliminates these and other causes of accidents. In multilane highways, this system prevents people from shifting lanes if there are other vehicles in the blind spot, thus, solving the blind spot problem. The vehicle would always be traveling down a corridor where the width of the corridor may be a lane or the entire road width or something in between depending on road conditions and the presence of other vehicles.

The invention is implemented through the use of both an inertial navigation system (INS) and a DGPS with carrier frequency enhancement. Due to the fact that the signals from at least four GPS or GLONASS satellites are not always available and to errors caused by multiple path reception from a given satellite, the DGPS systems cannot be totally relied upon. Therefore the INS is a critical part of the system. This will improve as more satellites are launched and additional ground stations are added. It will also significantly improve when the WAAS system in implemented and refined to work with land vehicles as well as airplanes.

Other improvements will now be obvious to those skilled in the art. The above features are meant to be illustrative and not definitive.

1.5 BRIEF REVIEW OF THE DRAWINGS

Figure 5:
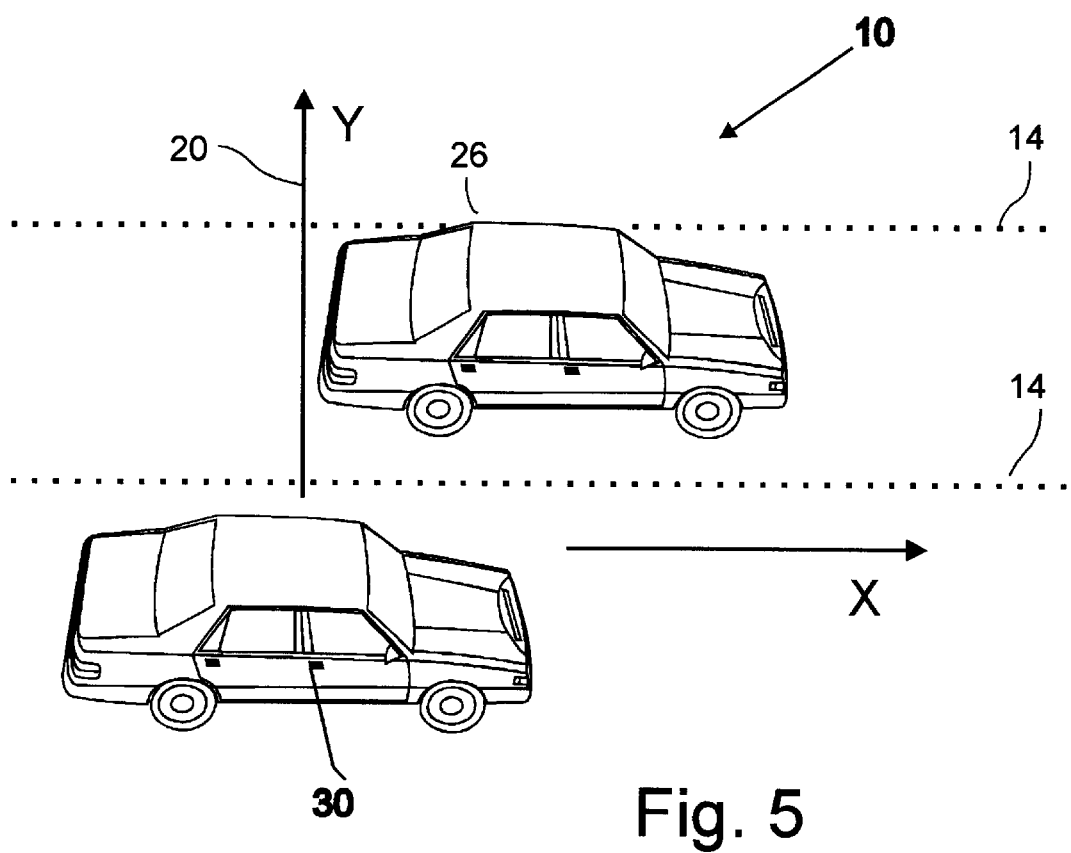

FIG. 5 illustrated two adjacent vehicles traveling on a roadway and communicating with each other.

Figure 6:
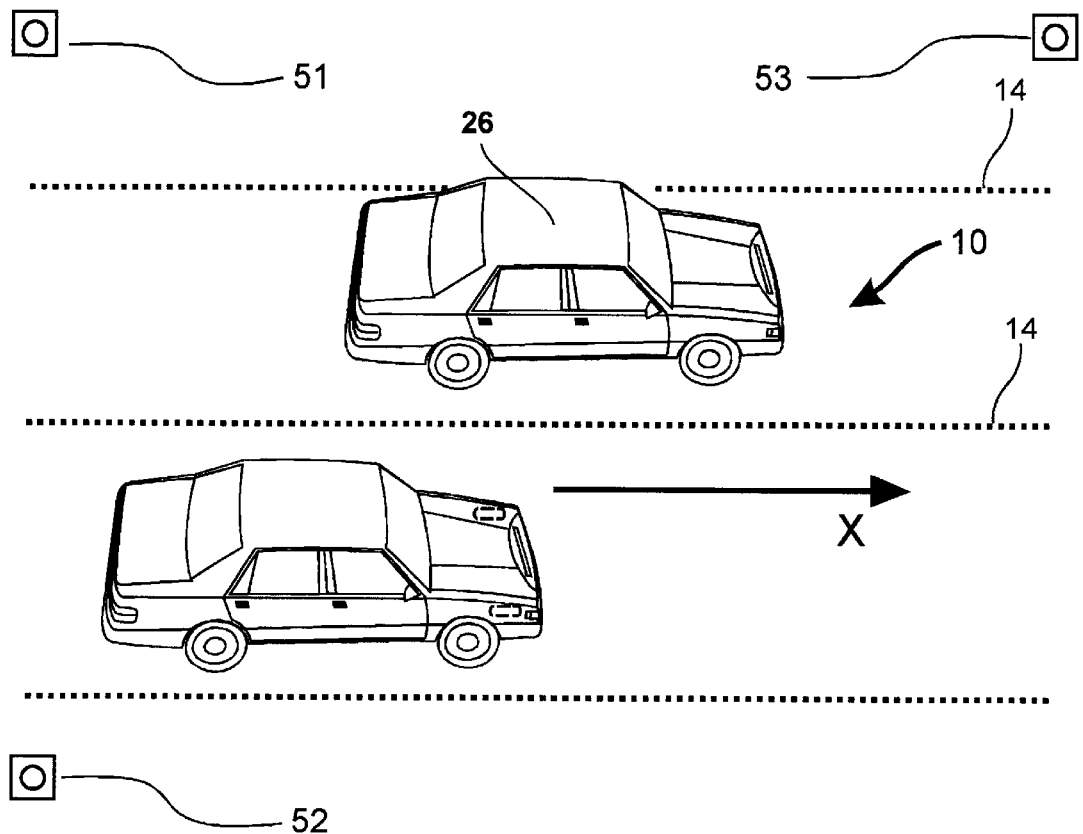

FIG. 6 illustrates the use of three micropower impulse radar transmitters in a configuration to allow a vehicle to accurately determine its position.

Figure 7:
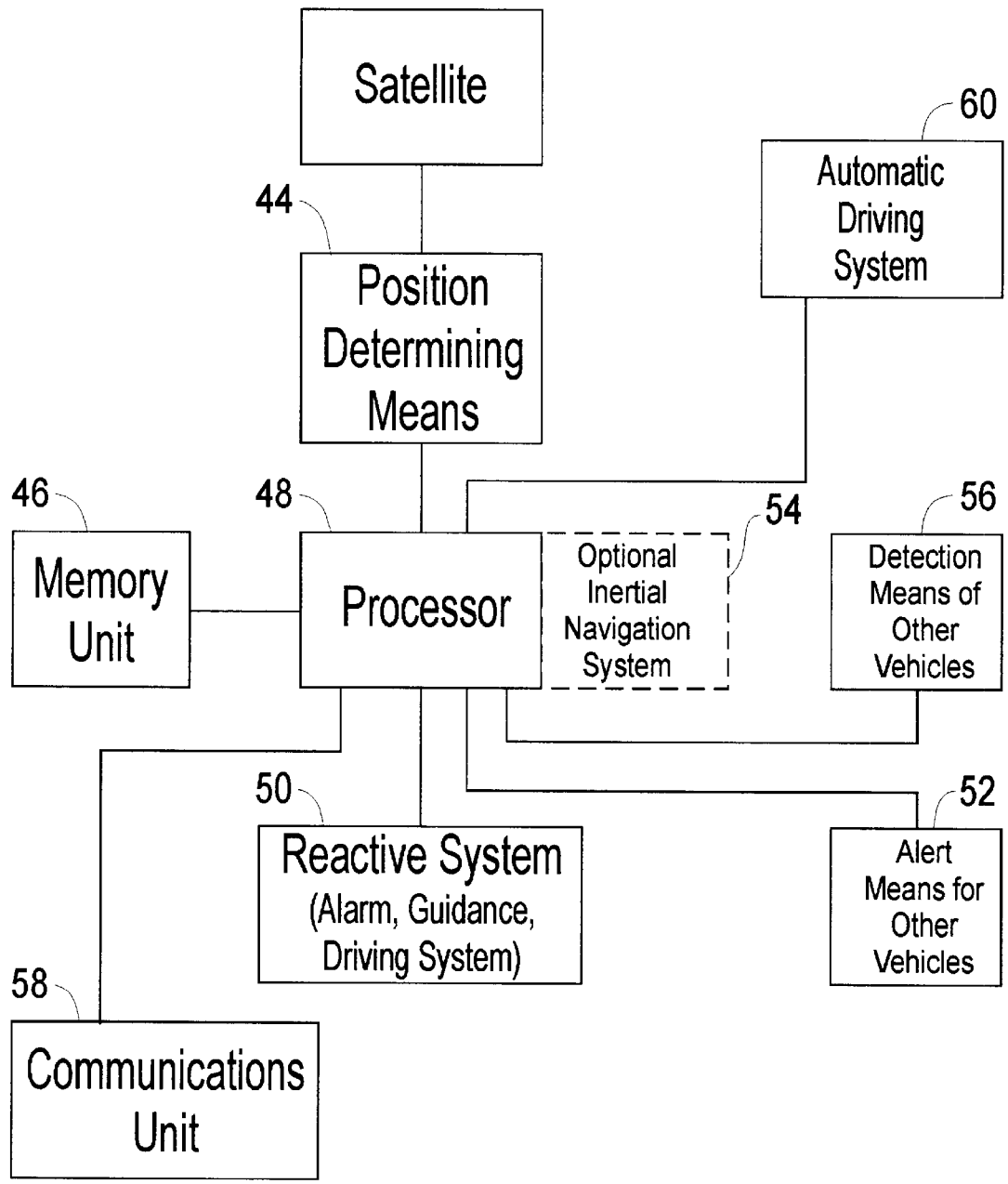

FIG. 7 is a schematic illustration of the system in accordance with the invention.

Figure 8:
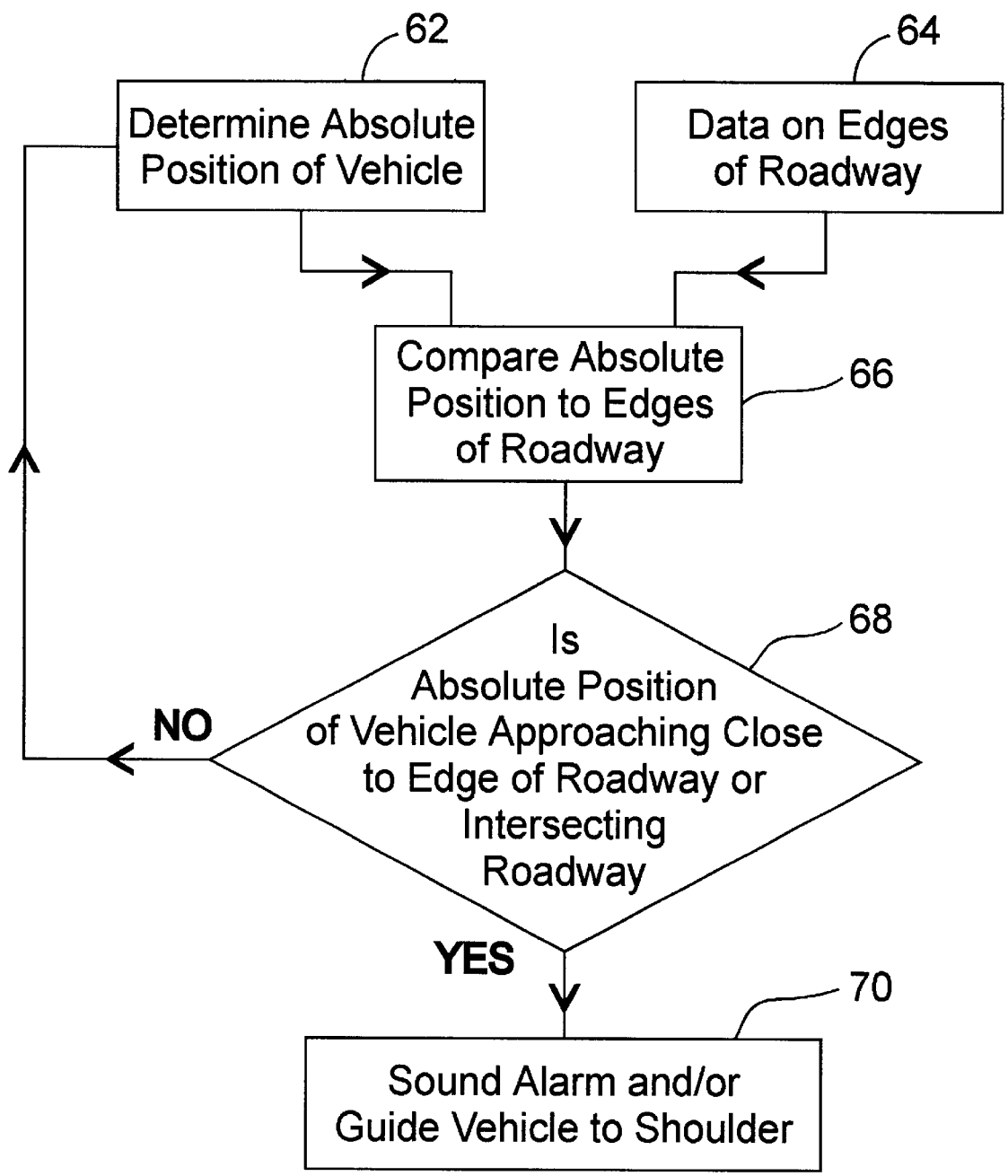

FIG. 8 is a flow chart of the method in accordance with the invention.

2. DESCRIPTION OF GPS SYSTEM

2.1 Background of GPS

Figure 1:
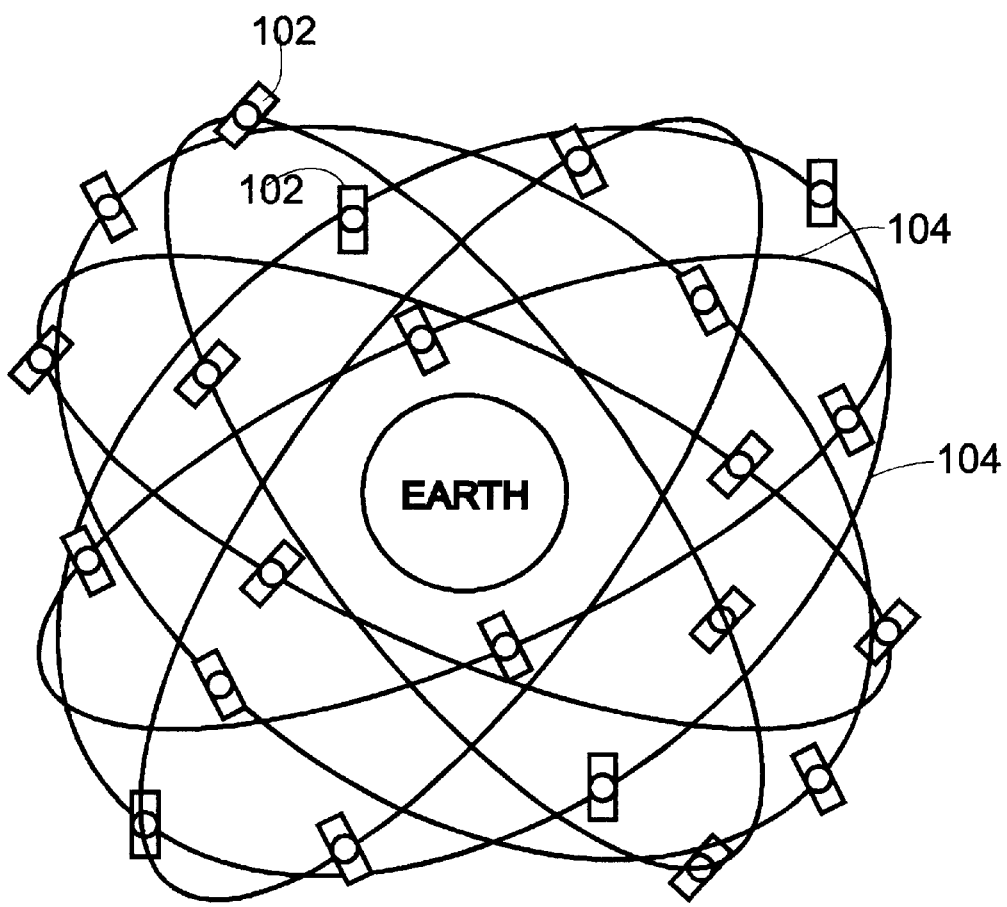
FIG. 1 illustrates the GPS satellite system with the 24 satellites revolving around the earth.

Referring to FIG. 1, the presently implemented Global Positioning System with its constellation of 24 satellites 102 is truly revolutionizing navigation throughout the world. The satellites orbit the Earth in six orbits 104. However, in order to reach its full potential for airline navigation, GPS needs to be augmented both to improve accuracy and to reduce the time needed to inform an aircraft pilot of a malfunction of a GPS satellite, the so-called integrity problem.

The Global Positioning System (GPS) is a satellite-based navigation and time transfer system developed by the U.S. Department of Defense. GPS serves marine, airborne and terrestrial users, both military and civilian. Specifically, GPS includes the Standard Positioning Service (SPS) that provides civilian users with 100 meter accuracy as to the location or position of the user. It also serves military users with the Precise Positioning Service (PPS) which provides 20 meter accuracy for the user. Both of these services are available worldwide with no requirement for any local equipment.

Differential operation of GPS is used to improve the accuracy and integrity of GPS. Differential GPS places one or more high quality GPS receivers at known surveyed locations to monitor the received GPS signals. This reference station(s) estimates the slowly varying components of the satellite range measurements, and forms a correction for each GPS satellite in view. The correction is broadcast to all DGPS users within the coverage area of the broadcast facilities.

For a good discussion of DGPS, for following paragraphs are reproduced from OMNISTAR:

"The new OMNISTAR Model 6300. A offers unprecedented versatility for portable, real-time, DGPS positioning. It can improve the accuracy of a GPS receiver by as much as 100 times. If your product or service needs precise positioning information, then chances are good that OMNISTAR can supply that need; and at a reasonable cost.

"What is a "DGPS" System?

"OMNISTAR is a Differential GPS (DGPS)System. It is capable of improving regular GPS to sub-meter accuracy. GPS computes a user's position by measuring ranges (actually, pseudoranges; which are ranges that are calculated by an iterative process) to three or more GPS satellites simultaneously. The Department of Defense (DOD) is intentionally limiting the accuracy of the calculation by continuously changing the onboard clock on the satellites. This process is called Selective Availability, or "SA". This appears as a continuous variation in the user's position. Using GPS in an uncorrected (stand-alone) mode, a user's calculated position will continuously move around the true position in a near-random pattern. The indicated position may move out as far as 100 meters from the true position. The randomness makes it impossible to predict. If a user samples the position data over a long period of time, such as 24 hours, the average or mean will likely be within a meter of the true position. In statistical terms, the standard deviation will be approximately 15 to 20 meters in each horizontal coordinate.

"A DGPS System generates corrections for SA and other errors. This is accomplished by the use of one or more GPS "Base Stations" that measure the errors in the GPS system and generate corrections. A "real-time" DGPS System not only generates the corrections, but provides some methodology for getting those corrections to users as quickly as possible. This always involves some type of radio transmission system. They may use microwave systems for short ranges, low frequencies for medium ranges and geostationary satellites for coverage of entire continents.

"The method of generating corrections is similar in most DGPS systems. A GPS base station tracks all GPS Satellites that are in view at its location. The internal processor knows the precise surveyed location of the base station antenna, and it can calculate the location in space of all GPS satellites at any time by using the epheremis that is a part of the normal broadcast message from all GPS satellites. From these two pieces of information, an expected range to each satellite can be computed at any time. The difference between that computed range and the measured range is the range error. If that information can quickly be transmitted to other nearby users, they can use those values as corrections to their own measured GPS ranges to the same satellites. The key word is "quickly", because of the rapid change in the SA errors. In most radio systems, bandwidth is a finite limitation which dictates how much data can be sent in a given time period. That limitation can be eased somewhat by having the GPS base station software calculate the rate of change of the errors and add that information as part of the correction message. That term is called the range rate value and it is calculated and sent along with the range correction term. The range correction is an absolute value, in meters, for a given satellite at a given time of day. The range rate term is the rate that correction is changing, in meters per second. That allows GPS user sets to continue to use the "correction, plus the rate-of-change" for some period of time while it's waiting for a new message. The length of time you can continue to use that data without an update depends on how well the range rate was estimated. In practice, it appears that OMNISTAR would allow about 12 seconds before the DGPS error would cause a one meter position error. In other words, the "age of data" can be up to 12 seconds before the error from that term would cause a one meter position error. OMNISTAR transmits a new correction message every two and one/half seconds, so even if an occasional message is missed, the user's "age of data" is still well below 12 seconds.

"What is unique about the OMNISTAR™ DGPS system?

"The OMNISTAR DGPS System was designed with the following objectives: (1) continental coverage; (2) sub-meter accuracy over the entire coverage area; and (3) a portable system (backpack). The first objective dictated that the transmission system had to be from a geostationary satellite. We purchased a transponder on satellite Spacenet 3, which is located at 87 degrees West longitude. It has an antenna pattern that covers most of North America; specifically, all of the 48 states, the northern half of Mexico and the southern half of Canada. It also has sufficient power within that footprint that a tiny omnidirectional antenna can be used at the user's receiver.

"The methodology developed by John E. Chance & Assoc. of using multiple GPS base stations in a user's solution and reducing errors due to the GPS signal traveling through the atmosphere, met the second objective. It was the first widespread use of a "Wide Area DGPS Solution". It is able to use data from a relatively small number of base stations and provide consistent accuracy over extreme distances. A unique method of solving for atmospheric delays and weighting of distant base stations, achieves sub-meter capability over the entire coverage area—regardless of the user's proximity to any base station. This achieves a truly nationwide system with consistent characteristics. A user can take the equipment anywhere within the coverage area and get consistent results, without any intervention or intimate knowledge of GPS or DGPS.

"The units being sold today are sufficiently portable that they can used in a backpack. They can include an internal GPS engine (optional) that will provide a complete solution in a single system package. All that is needed is a data collector or notebook computer for display and storage of corrected GPS data.

"How does OMNISTAR work?

"The OMNISTAR Network consists of ten permanent base stations that are scattered throughout the Continental US, plus one in Mexico. These stations track all GPS Satellites above 5 degrees elevation and compute corrections every 600 milliseconds. The corrections are in the form of an industry standard message format called RTCM-104, Version II. The corrections are sent to the OMNISTAR Network Control Center in Houston via lease lines, with a dial back-up. At the NCC these messages are checked, compressed, and formed into a packet for transmission up to our satellite transponder. This occurs approximately every 2 to 3 seconds. A packet will contain the latest data from each of the 11 base stations.

"All OMNISTAR user sets receive these packets of data from the satellite transponder. The messages are first decoded from the spread-spectrum transmission format and then uncompressed. At that point, the message is an exact duplicate of the data as it was generated at each base station. Next, the atmospheric errors must be corrected. Every base station automatically corrects for atmospheric errors at it's location; but the user is not at any of those locations, so the corrections are not optimized for the user—and, OMNISTAR has no information as to each individual's location. If these errors are to be optimized for each user, then it must be done in each user's OMNISTAR. For this reason, each OMNISTAR user set must be given an approximation of its location. The approximation only needs to be within 50 to 100 miles of its true position. Given that information, the OMNISTAR user set can remove most of the atmospheric correction from each Base Station message and substitute a correction for his own location. In spite of the loose approximation of the user's location, this information is crucial to the OMNISTAR process. It makes the operation totally automatic and it is necessary for sub-meter positioning. If it is totally ignored, errors of up to ten meters can result.

"Fortunately, this requirement of giving the user's OMNISTAR an approximate location is easily solved. If OMNISTAR is purchased with the optional internal GPS receiver installed, the problem is taken care of automatically by using the position output of the GPS receiver as the approximation. It is wired internally to do exactly that. An alternate method—when the internal GPS receiver is not present—is to use the user's external GPS receiver for this function. In that case, the user's receiver must have an output message in one of the approved formats (NMEA) and protocols that OMNISTAR can recognize.

"That output can be connected back to the OMNISTAR set by using the same cable that normally supplies the RTCM-104 from OMNISTAR to the user's GPS receiver. This method works perfectly well when all the requirements on format and protocol are met. There is a third method, where a user uses a notebook computer to type in an estimated location into the OMNISTAR user set. Any location entered by this method is preserved—with an internal battery—until it is changed. This method works fine where the user does not intend to go more than 50–100 miles from some central location.

"After the OMNISTAR processor has taken care of the atmospheric corrections, it then uses it's location versus the eleven base station locations, in an inverse distance-weighted least-squares solution. The output of that least-squares calculation is a synthesized RTCM-104 Correction Message that is optimized for the user's location. It is always optimized for the user's location that is input from the user's GPS receiver or as an approximation that is typed in from a notebook computer. This technique is called the "Virtual Base Station Solution". It is this technique that enables the OMNISTAR user to operate independently and consistently over the entire coverage area without regard to where he is in relation to our base stations. As far as we have determined, users are obtaining the predicted accuracy over the entire area."

The above description is provided to illustrate the accuracy which can be obtained from the DGPS system. It is expected that the WAAS system when fully implemented will provide the same benefits as provided by the OMNISTAR system. However, when the standard deviation of approximately 0.5 meter is considered, it is evident that GLONASS is a Russian system similar to GPS. This system provides accuracy that is better than GPS with SA on and not as good as GPS with SA off. It is expected that SA will be removed before the system described herein is implemented.

The Projected Position Accuracy of GPS and GLONASS, Based on the Current Performance is:

|  | Horizontal Error (m) | | Vertical Error (m) |
| --- | --- | --- | --- |
|  | (50%) | (95%) | (95%) |
| GPS (SA off) | 7 | 18 | 34 |
| GPS (SA on) | 27 | 72 | 135 |
| GLONASS | 10 | 26 | 45 |
| GPS + GLONASS | 9 | 20 | 38 |

The system described here will achieve a higher accuracy than reported in the above table due to the combination of the inertial guidance system that permits accurate changes in position to be determined and through multiple GPS readings. In other words, the calculated position will converge to the real position over time. The addition of DGPS will provide an accuracy improvement of at least a factor of 10, which, with the addition of a sufficient number of pseudolite and DGPS stations could be sufficient without the use of the carrier frequency correction. A further refinement where the vehicle becomes its own DGPS station through the placement of infrastructure stations at appropriate locations on roadways will further significantly enhance the system accuracy to the required level.

Multipath is the situation where more than one signal from a satellite comes to a receiver with one of the signals resulting from a reflection off of a building or the ground, for example. Since multipath is a function of geometry, the system can be designed to eliminate its effects based on highway surveying and appropriate antenna design. Multipath from other vehicles can also be eliminated since the location of the other vehicles will be known.

2.2 DGPS

As discussed below, the Wide Area Augmentation System (WAAS) is being installed by the US Government to provide DGPS for airplane landings. The intent is to cover the entire continental U.S. (CONUS). This may be useful for much of the country for the purposes of this invention. Another alternative would be to use the cellular phone towers, since there are so many of them, if they could be programmed to act as pseudolites.

An important feature of DGPS is that the errors from the GPS satellites change slowly with time and therefore, only the corrections need be sent to the user from time to time. Using reference receivers separated by 25–120 km, accuracies from 10 cm to 1 m are achievable using DGPS which is marginal for RtZF™. Alternately, through the placement of appropriate infrastructure transmitters as described below even better accuracies are obtainable.

A type of wide area DGPS system has been developed spans the entire US continent which provides position RMS accuracy to better than 50 cm. This system is described in the Bertiger, et al, "A Prototype Real-Time Wide Area Differential GPS System," Proceedings of the National Technical Meeting, Navigation and Positioning in the Information Age, Institute of Navigation, Jan. 14–16, 1997 pp. 645–655. A RMS error of 50 cm would be marginally accurate for RtZF™. Many of the teachings of this invention especially if the road edge and lane location error were much less which could be accomplished using more accurate surveying equipment.

A similar DGPS system which is now being implemented on a nationwide basis is described in" "DGPS Architecture Based on Separating Error Components, Virtual Reference Stations and FM Subcarrier Broadcast", by Differential Corrections Inc., 10121 Miller Ave., Cupertino, Calif. 95041. The system described in this paper promises an accuracy on the order of 10 cm.

Suggested DGPS update rates are usually less than twenty seconds. DGPS removes common-mode errors, those errors common to both the reference and remote receivers (not multipath or receiver noise). Errors are more often common when receivers are close together (less than 100 km). Differential position accuracies of 1–10 meters are possible with DGPS based on C/A code SPS signals.

Using the Cnet commercial system, 1 foot accuracies are possible if base stations are no more than 30 miles from the vehicle unit. This would require approximately 1000 base stations to cover CONUS. Alternately, the same accuracy is obtainable if the vehicle can become its own DGPS system every 30 miles as described below.

Unfortunately, the respective error sources mentioned above rapidly decorrelate as the distances between the reference station and the vehicle increases. Conventional DGPS is the terminology used when the separation distances are sufficiently small that the errors cancel. The terms single-reference and multi-reference DGPS are occasionally used in order to emphasize whether there is a single reference station or whether there are multiple ones. If it is desired to increase the area of coverage and, at the same time, to minimize the number of fixed reference receivers, it becomes necessary to model the spatial and temporal variations of the residual errors. Wide Area Differential GPS (WADGPS) is designed to accomplish this. In addition, funds have now been appropriated for the US Government to deploy a national DGPS system.

2.3 Pseudolites

Pseudolites are artificial satellite like structures, can be deployed to enhance the accuracy of the DGPS system. Such structures could become part of the RtZF™ system.

2.4 WAAS

The Wide Area Augmentation System (WAAS) is being deployed to replace the Instrument Landing System used at airports across the country. The WAAS system provides an accuracy of from 1 to 2 meters for the purpose of aircraft landing. If the vertical position of the vehicle is known, as would be in the case of automobiles at a known position on a road, this accuracy can be improved significantly. Thus, for many of the purposes of this invention, the WAAS can be used to provide accurate positioning information for vehicles on roadways. The accuracy of the WAAS is also enhanced by the fact that there is an atomic clock in every WAAS receiver station that would be available to provide great accuracy using carrier phase data. With this system sub-meter accuracies are possible for some locations.

The WAAS is based on a network of approximately 35 ground reference stations. Signals from GPS satellites are received by aircraft receivers as well as by ground reference stations. Each of these reference stations is precisely surveyed, enabling each to determine any error in the GPS signals being received at its own location. This information is then passed to a wide area master station. The master station calculates correction algorithms and assesses the integrity of the system. This data is then put into a message format and sent to a ground earth station for uplink to a geostationary communications satellite. The corrective information is forwarded to the receiver on board the aircraft, which makes the needed adjustments. The communications satellites also act as additional navigation satellites for the aircraft, thus, providing additional navigation signals for position determination.

This system will not meet all of FAA's requirements. For category III landings, the requirement is 1.6-m vertical and horizontal accuracy. To achieve this, FAA is planning to implement a network of local area differential GPS stations that will provide the information to aircraft. This system is referred to as the Local Area Augmentation System (LAAS).

The WAAS system, which consists of a network of earth stations and geo-synchronous satellites, is currently being funded by the U.S. Government for aircraft landing purposes. Since the number of people that die yearly in automobile accidents greatly exceeds those killed in airplane accidents, there is clearly a greater need for a WAAS type system for solving the automobile safety problem using the teachings of this invention. Also, the reduction in required highway funding resulting from the full implementation of this invention would more then pay for the extension and tailoring of the WAAS to cover the nations highways.

2.5 LAAS

The Local Area Augmented System (LAAS) is also being deployed in addition to the WAAS system to provide even greater coverage for the areas surrounding major airports. According to Newsletter of the Institute of Navigation, 1997, "the FAA's schedule for (LAAS) for Category II and III precision instrument approaches calls for development of standards by 1998 that will be sufficient to complete a prototype system by 2001. The next step will be to work out standards for an operational system to be fielded in about 2005, that could serve nationwide up to about 200 runways for Cat II-III approaches."

In a country like the United States, which has many airfields, a WAAS can serve a large market and is perhaps most effective for the control of airplane landings. The best way for other countries, with fewer airports, to participate in the emerging field of GPS-based aviation aids may be to build LAAS. In countries with a limited number of airports, LAAS is not very expensive while the costs of building a WAAS to get Category I type accuracy is very expensive. However, with the added benefit of less highway construction and greater automobile safety, the added costs for a WAAS system may well be justified for much of the world.

For the purposes of the RtZF™ system, both the WAAS and LAAS would be useful but probably insufficient. Unlike an airplane, there are many places where it might not be possible to receive LAAS and WAAS information or even more importantly the GPS signals them selves with sufficient accuracy and reliability. Initial RtZF™ systems may therefore rely on the WAAS and LAAS but as the system develops more toward the goal of zero fatalities road based systems which permit a vehicle to pinpoint its location are preferred. However, there is considerable development ongoing in this field so that all systems are still candidates for use with RtZF™ and only time will determine which are the most cost effective.

2.6 Carrier Phase Measurements

An extremely accurate form of GPS is Carrier Based Differential GPS. This form of GPS utilizes the 1.575 GHz carrier component of the GPS signal on which the Pseudo Random Number (PRN) code and the data component are superimposed. Current versions of Carrier Based Differential GPS involve generating position determinations based on the measured phase differences at two different antennas, a base station or pseudolite and the vehicle, for the carrier component of a GPS signal. This technique initially requires determining how many integer wave-lengths of the carrier component exist between the two antennas at a particular point in time. This is called integer ambiguity resolution. A number of approaches currently exist for integer ambiguity resolution. Some examples can be found in U.S. Pat. Nos. 5,583,513 and 5,619,212. Such systems can achieve sub-meter accuracies and, in some cases, accuracies of 1 cm. U.S. Pat. No. 5,477,458 discloses a DGPS system that is accurate to 5 cm with the base stations located on a radius of 3000 km. With such a system, very few base stations would be required to cover the continental United States. This system still suffers from the availability of accurate signals at the vehicle regardless of its location on the roadway and the location of surrounding vehicles and objects. Nevertheless, the principle of using the carrier frequency to precisely determine the location of a vehicle can be used with the highway based systems described below to provide extreme location accuracies. Using the system described below where a vehicle becomes its own DGPS system, the carrier phase ambiguity problem also disappears.

2.7 Other Aids

There are other sources of information that can be added to increase the accuracy of position determination. The use of GPS with four satellites provides the three dimension location of the vehicle plus time. Of the dimensions, the vertical is the least accurately known, yet, if the vehicle knows where it is on the roadway, the vertical dimension is not only the least important but it is also already accurately known from the roadmap information plus the inertial guidance system.

Another aid is to provide markers along side the roadway which can be either visual, passive or active transponders, or a variety of other technologies, which have the property that as a vehicle passes the marker it can determine the identity of the marker and from a data base it can determine the exact location of the marker. If three or more of such markers are placed along side of the roadway, a passing vehicle can determine its exact location by triangulation. Although it may be impractical to initially place such markers along all roadways, it would be reasonable to place them in particularly congested areas or places where it is known that a view of one or more of the GPS satellites is blocked. A variation of this concept will be discussed below.

Although initially it is preferred to use the GPS navigational satellites as the base technology, the invention is not limited thereby and contemplates using all methods by which the location of the vehicle can be accurately determined relative to the earth surface. The location of the roadway boundaries and the location of other vehicles relative to the earth surface are also to be determined and all relevant information used in a control system to substantially reduce and eventually eliminate vehicle accidents. Only time and continued system development will determine the mix of technologies that provide the most cost effective solution. All forms of information and methods of communication to the vehicle are contemplated including direct communication with stationary and moving satellites, communication with fixed earth based stations using infrared, optical, radar, radio and other segments of the electromagnetic spectrum. Some additional examples follow:

A pseudo-GPS can be delivered from cell phone stations, in place of or in addition to satellites. DGPS corrections can be communicated to a vehicle via FM radio via a sub-carrier frequency for example. An infrared or radar transmitter along the highway can transmit road boundary location information. A CD-ROM or other portable mass storage can be used at the beginning of a controlled highway to provide road boundary information to the vehicle. Finally, it is contemplated that eventually a satellite will broadcast periodically, perhaps every five minutes, a table of dates covering the entire CONUS that provides the latest update date of each map segment. If a particular vehicle does not have the latest information for a particular region where it is operating, it will be able to use its cell phone to call and retrieve such road maps perhaps through the Internet. Emergency information would also be handled in a similar manner so that if a tree fell across the highway, all nearby vehicles would be notified.

2.8 Other Location Fixing Systems

It is expected, especially initially, that there will be many holes in the DGPS or GPS and their various implementations that will leave the vehicle without an accurate means of determining its location. The inertial navigation system described below will help in filling these holes but its accuracy is limited to a time period significantly less than an hour and a distance of less than 50 miles before it needs correcting. That may not be sufficient to cover the period between DGPS availability. It is therefore contemplated that the RtZF™ system will also make use of low cost systems located along the roadways that permit a vehicle to accurately determine its location. One example of such a system would be to use a group of three Micropower Impulse Radar (MIR) units such as developed by Lawrence Livermore Laboratory.

A MIR operates on very low power and periodically transmits a very short spread spectrum radar pulse. The estimated cost of a MIR is less than $10 even in small quantities. If three such MIRs, 51, 52 and 53, as shown in FIG. 6, are placed along the highway and triggered simultaneously, and if a vehicle has an appropriate receiver system, the time of arrival of the pulses can be determined and thus the location of the vehicle relative to the transmitters determined. The exact location of the point where all three pulses arrive simultaneously would be the point that is equal distant from the three transmitters and would be located on the map information. Thus it would not even be necessary to have the signals contain identification information since the vehicle would not be so far off in its position determination system to confuse different locations. By this method, the vehicle would know exactly where it was whenever it approached and passed such a triple-MIR installation.

Naturally, several such readings and position determinations can be made with one approach to the MIR installation, the vehicle need not wait until they all arrive simultaneously. Also the system can be designed so that the signals never arrive at the same time and still provide the same accuracy as long as there was a sufficiently accurate clock on board. One way at looking at FIG. 6 is that transmitters 51 and 52 fix the lateral position of the vehicle while transmitters 51 and 53 fix the location of the vehicle longitudinally. The three transmitters need not be along the edges on one lane but could span multiple lanes and they need not be at ground level but could be placed sufficiently in the air so that passing trucks would not block the path of the radiation from an automobile. Particularly in congested areas it might be desirable to code the pulses and to provide more than three transmitters to further protect against signal blockage or multipath.

The power requirements for the MIR are sufficiently low that a simple photoelectric cell array can provide sufficient power for most if not all CONUS locations. With this exact location information, the vehicle can become its own DGPS station and determine the corrections necessary for the GPS. It can also determine the integer ambiguity problem and thereby know the exact number of wave lengths between the vehicle and the satellites or the vehicle and the last MIR installation.

2.9 Inertial Navigation System

In many cases, especially before the system implementation becomes mature and the complete infrastructure is in place, there will be times when the system is not operational. This could be due to obstructions hiding a clear view of a sufficient number of GPS satellites, such as when a vehicle enters a tunnel. It could also be due to a lack of road boundary information, due to construction or the fact that the road has not been surveyed and the information recorded and made available to the vehicle, or a variety of other causes. It is contemplated, therefore, that each equipped vehicle will contain a warning light that warns the driver when he is at a position where the system is not operational. If this occurs on one of the especially designated highway lanes, the vehicle speed will then also be reduced until the system again becomes operational.

When the system is non-operational for a short distance, the vehicle will still accurately know its position if there is in addition a laser gyroscope, or equivalent, and some other velocity or position measuring system which together is referred to as an Inertial Navigation System (INS).

In implementations where control of the vehicle steering is assumed by the system at least to the extent that the vehicle is prevented from leaving its assigned corridor, the vehicle should also have a yaw rate sensor rather than relying on a steering wheel angle sensor which can be less accurate.

As more sensors which are capable of providing information on the vehicle position, velocity and acceleration are added onto the vehicle, the system can become sufficiently complicated as to require a neural network system to permit the optimum usage of the available information. This becomes even more important when information from outside the vehicle other than the GPS related systems becomes more and more available. For example, a vehicle may be able to communicate with other vehicles that have similar systems and learn their estimated location. If the vehicle can independently measure the position of the other vehicle, for example through the use of the scanning impulse laser radar system described below, and thereby determine the relative position of the two or more vehicles, a further improvement of the position can be determined for all such vehicles. Adding all such additional information into the system would probably require a computational method such as neural networks or a combination of a neural network and a fuzz logic system.

2.9 Conclusion—How Used

One way of imagining the system operation is to consider each car and roadway edge to behave as if it had a surrounding "force field" that would prevent it from crashing into another vehicle or an obstacle along the roadway. A vehicle operator would be prevented from causing his or her vehicle to leave its assigned corridor. This is accomplished with a control system that controls the steering, acceleration and perhaps the vehicle brakes based on its knowledge of the location of the vehicle, highway boundaries and other nearby vehicles. In a preferred implementation, the location of the vehicle is determined by first using the GPS L1 signal to determine its location within 100 meters. Then using DGPS and corrections which are broadcast whether by FM or downloaded from geo-synchronous satellites or obtained from road based transmitters to determine its location within less than 10 meters and perhaps even less than one meter. Finally the use of a MIR system periodically permits the vehicle to determine its exact location and thereby determine the GPS corrections, eliminate the carrier cycle ambiguity and set the INS system. If this is still not sufficient, then the phase of the carrier frequency provides the required location information to significantly less than one meter. Dead reckoning, or inertial guidance, is used to fill in the gaps. Where satellites are out of view, pseudolites, or other systems, are placed along the highway. A pulsed scanning infrared laser radar system, or an equivalent system, is used for near obstacle detection. Communication to other vehicles is by short distance radio.

One problem which will require addressing as the system becomes mature is satellite temporary blockage by large trucks or other movable objects whose location cannot be foreseen by the system designers. Another concern is to prevent vehicle owners from placing items on the vehicle exterior that block the GPS antennas.

3. COMMUNICATION WITH OTHER VEHICLES—COLLISION AVOIDANCE

MIR might also be used for Vehicle to vehicle communication except that it is line of sight. An advantage is that we can know when a particular vehicle will respond by range gating. Also the short time of transmission permits many vehicles to communicate at the same time

3.1 Description—Requirements

The communication between vehicles cannot be based on line-of-sight technologies as this is not sufficient since vehicles which are out of sight can still cause accidents. On the other hand, vehicles that are a mile away but still in sight, need not be part of the communication system. Messages sent by each vehicle of the subject invention would contain information indicating exactly where it is located and perhaps information as to what type of vehicle it is. The subject vehicle can therefore eliminate all of those vehicles that are not potential threats, even if such vehicles are very close, but on the other side of the highway barrier.

The use of an Ethernet protocol will satisfy the needs of the network, which would consist of all threatening vehicles in the vicinity of the subject vehicle. Alternately, a network where the subject vehicle transmits a message to a particular vehicle and waits for a response could be used. From the response time, the relative position of other vehicles can be ascertained which provides one more method of position determination. Thus, the more vehicles that are on the road with the equipped system, the greater accuracy of the overall system and thus the safer the system becomes.

To prevent accidents caused by a vehicle leaving the road surface and impacting a roadside obstacle requires only an accurate knowledge of the position of the vehicle and the road boundaries. To prevent collisions with other vehicles requires that the position of all nearby automobiles must be updated continuously. But just knowing the position of a threatening vehicle is insufficient. The velocity, size and orientation of the vehicle is also important in determining what defensive action may be required. Once all vehicles are equipped with the system of this invention, the communication of all relevant information will take place via a radio communication link. In addition to signaling its absolute position, each vehicle will send a message identifying the approximate mass, velocity, orientation, and other relevant information. This has the added benefit that emergency vehicles can make themselves known to all vehicles in their vicinity and all such vehicles can then take the appropriate action. The same system can also be used to relay accident or other hazard information from vehicle to vehicle.

U.S. Pat. No. 5,128,669 to Dabbs provides for 2-way communication and addressing messages to specific vehicles. This is unnecessary and the communications can be general since the amount of information that is unique to one vehicle is small. A method of handing bi-directional communication was disclosed in U.S. Pat. No. 5,506,584 to Boles.

3.3 Preferred System

One preferred method of communication between vehicles uses that portion of the electromagnetic spectrum that permits only line of sight communication. In this manner, only those vehicles that are in view can communicate. In most cases, a collision can only occur between vehicles that can see each other. This system has the advantage that the "communications network" only contains nearby vehicles. This would require that when a truck, for example, blocks another stalled vehicle that the information from the stalled vehicle be transmitted via the truck to a following vehicle. An improvement in this system would use a rotating aperture that would only allow communication from a limited angle at a time further reducing the chance for multiple messages to interfere with each other. Each vehicle transmits at all angles but receives at only one angle at a time. This has the additional advantage of confirming at least the direction of the transmitting vehicle. An infrared rotating receiver can be looked at as similar to the human eye. That is, it is sensitive to radiation from a range of directions and then focuses in on the particular direction, one at a time, from which the radiation is coming. It needn't scan continuously. In fact the same transmitter which transmits 360 degrees could also receive from 360 degrees with the scanning done in software.

An alternate preferred method is to use short distance radio communication so that a vehicle can receive position information from all nearby vehicles. The location information from each vehicle can then be used to eliminate it from further monitoring if it is on a different roadway or somehow not in a potential collision path of the subject vehicle. A related method would be to use a MIR system in a communications mode. Since the width of the pulses typically used by MIR is less than a nanosecond, many vehicles can transmit simultaneously without fear of interference.

With either system, other than the MIR system, the potential exists that more than one vehicle will attempt to send a communication at the same time and there will then be a data collision. If all of the communicating vehicles are considered as being part of a local area network, the standard Ethernet protocol can be used to solve this problem. In that protocol, when a data collision occurs, each of the transmitting vehicles which was transmitting at the time of the data collision would be notified that a data collision had occurred and that they should retransmit their message at a random time later. When several vehicles are in the vicinity and there is the possibility of collisions of the data, each vehicle can retain the coordinates last received from the surrounding vehicles as well as their velocities and predict their new locations even though some data was lost.

If a line of sight system were used, an infrared or MIR system would be good choices. In the infrared case, and if an infrared system were also used to interrogate the environment for non-equipped vehicles, pedestrians, animals etc., as will be discussed below, both systems could use some of the same hardware.

If point to point communication can be established between vehicles, such as described in U.S. Pat. No. 5,528,391 to Elrod, then the need for a collision detection system like Ethernet would not be required. If the receiver on a vehicle, for example, only has to listen to one sender from one other vehicle at a time, then the bandwidth can be considerably higher since there will not be any interruption.

3.4 Enhancements

In the accident avoidance system of the present invention, the information indicative of a collision could come from a vehicle that is quite far away from the closest vehicles to the subject vehicle. This is a substantial improvement over the prior art collision avoidance systems, which can only react to a few vehicles in the immediate vicinity. The system described herein also permits better simultaneous tracking of several vehicles. For example, if there is a pileup of vehicles down the highway then this information can be transmitted to control other vehicles that are still a significant distance from the accident. This case cannot be handled by prior art systems. Thus, the system described here has the potential to be part of the U.S. Pat. No. 5,572,428 to Ishida, for example.

The network analogy can be extended if each vehicle receives and retransmits all received data as a single block of data. In this way, each vehicle is assured in getting all of the relevant information even if it gets it from many sources. Even with many vehicles, the amount of data being transmitted is small relative to the bandwidth of the infrared optical or radio technologies. Naturally, in some particular cases, a receiver and retransmitter can be part of the highway infrastructure. Such a case might be on a hairpin curve in the mountains where the oncoming traffic is not visible.

In some cases, it may be necessary for one vehicle to communicate with another to determine which evasive action each should take. This could occur in a multiple vehicle situation when one car has gone out of control due to a blowout, for example. In such cases, one vehicle may have to tell the other vehicle what evasive actions it is planning. The other vehicle can then calculate whether it can avoid a collision based of the planned evasive action of the first vehicle and if not it can inform the first vehicle that it must change its evasive plans. The other vehicle would also inform the first vehicle as to what evasive action it is planning. Several vehicles communicating in this manner can determine the best paths for all vehicles to take to minimize the danger to all vehicles.

If a vehicle is stuck in a corridor and wish to change lanes in heavy traffic, the operator's intention can be signaled by the operator activating the turn signal. This could send a message to other vehicles to slow down and let the signaling vehicle change lanes. This would be particularly helpful in an alternate merge situation.

4. COMMUNICATION WITH HIGHWAY—MAPS

4.1 Statement of the Problem

The initial maps showing roadway lane and boundary location for the CONUS should preferably be installed within the vehicle at the time of manufacture The vehicle thereafter would check on a section by section basis whether it had the latest update information for the particular and surrounding locations where it is being operated. One method of verifying this information would be achieved if a satellite periodically broadcasts the latest date and time that each segment had been most recently updated. This matrix would amount to a small transmission requiring perhaps one minute of airtime. Any additional emergency information could also be broadcast in between the periodic transmissions to cover accidents, trees falling onto roads etc. If the periodic transmission were to occur every five minutes and if the motion of a vehicle were somewhat restricted until it had received a periodic transmission, the safety of the system can be assured. If the vehicle finds that it does not have the latest map information, the cell phone in the vehicle can be used to log onto the Internet, for example, and the missing data downloaded. If the amount of data is too great, the download could be accomplished from a satellite.

It is also possible that the map data could be off loaded from a transmitter on the highway itself. In that manner, the vehicles would only obtain that map information which it needed and the map information would always be up to the minute. As a minimum, temporary data communication stations can be placed before highway sections that are undergoing construction or where a recent blockage has occurred and where the maps have not yet been updated. Such an emergency data transfer would be signaled to all approaching vehicles to reduce speed and travel with care. Naturally such information could also contain maximum speed information which would limit the velocity of vehicles in the area.

There is other information that would be particularly useful to a vehicle operator or control system, including in particular the weather conditions especially at the road surface. Such information could be obtained by road sensors and then transmitted to all vehicles in the area by a permanently installed system. Alternately, there have been recent studies that show that icing conditions on road surfaces, for example, can be accurately predicted by local meteorological stations and broadcast to vehicles in the area. In such a system is not present, then, the best place to measure road friction is at the road surface and not on the vehicle. The vehicle requires advance information of an icing condition in order to have time to adjust its speed or take other evasive action. The same road based or local meteorological transmitter system could be used to warn the operators of traffic conditions, construction delays etc. and to set the local speed limit.

4.2 Maps Etc

All information regarding the road, both temporary and permanent, should be part of the map data base, including speed limits, presence of guard rails, width of each lane, width of the highway, width of the shoulder exactly where the precise position location apparatus is located, etc. The Speed limit associated with particular locations on the maps should be coded in such a way that the speeds limit can depend upon the time of day and the weather conditions. In other words, the speed limit is a variable that will change from time to time depending on conditions. It is contemplated that there will be a display for various map information present which will always be in view for the passenger and for the driver at least when the vehicle is operating under automatic control. Additional user information can thus also be displayed such as traffic conditions, weather conditions, advertisements, locations of restaurants and gas stations, etc.

A map showing the location of road and lane boundaries can be easily generated using a specially equipped survey vehicle that has the most accurate position measurement system available. In some cases, it might be necessary to set up one or more temporary local DGPS base stations in order to permit the survey vehicle to know its position within a few centimeters. The vehicle would drive down the roadway while operators, using specially designed equipment, sight the road edges and lanes. This would probably best be done with laser pointers. Transducers associated with the pointing apparatus record the angle of the apparatus and then by triangulation determine the distance of the road edge or lane marking from the survey vehicle. Since the vehicle's position would be accurately known, the boundaries and lane markings can be accurately determined. It is anticipated that the mapping activity would take place continuously such that all roads in a particular state would be periodically remapped in order to pickup up any changes which were missed by other monitoring systems and to improve the reliability of the maps by minimizing the chance for human error.

In some cases where the roadway is straight, the survey vehicle could travel at moderate speed while obtaining the boundary and lane location information. In other cases, where the road in turning rapidly, more readings would be required per mile and the survey vehicle would need to travel more slowly. In any case, the required road information can be acquired semi-automatically with the survey vehicle traveling at a moderate speed. Thus, the mapping of a particular road would not require significant time or resources. It is contemplated that a few such survey vehicles could map all of the major roads in the United States in less than one year.

The mapping effort could be supplemented and cross-checked though the use of accurate detailed digital photogrammetic systems which, for example, can determine the road altitude with an accuracy to <50 cm. Efforts are underway to map the earth with 1 meter accuracy. The generated maps could be used to check the accuracy of the road determined maps.

As the roadway is being mapped, the availability of GPS satellite view and the presence of multipath reflections from fixed structures can also be determined. This information can then be used to determine the advisability of locating a local precise location system at a particular spot on the roadway.

4.3 Privacy

Another issue is privacy. People don't necessarily want the government to know where they are going and therefore will not want information that can identify the vehicle to be transmitted.

It has been estimated that there are 100,000 vehicles on the road, many of them stolen, where the operators do not want the vehicle to be identified. If an identification process that positively identifies the vehicle were made part of this system, it could cut down of vehicle theft. On the other hand, thieves would disconnect the system thereby defeating the full implementation of the system and thus increasing the danger on the roadways and defeating the objective of this invention. This is a problem that will be addressed as the road to zero fatalities project evolves. You cannot have zero fatalities in the situation where people are disconnecting the system.

5. COMMUNICATION WITH VEHICLES WHICH DON'T HAVE SYSTEM

5.1 Problem Statement

Vehicles with the RtZF™ system of this invention must also be able to detect those vehicles that do not have the system as well as pedestrians, animals, bicyclists, and other hazards that may cross the path of the equipped vehicle.

5.2 Prior Art

Although, there appears not to be any significant prior art involving a vehicle communicating safety information to another vehicle on the roadway, several of the prior art patents discuss methods of determining that a collision might take place using infrared and radar. U.S. Pat. No. 5,249,128 to Markandey et al., for example, discusses methods of using infrared to determine the distance to a vehicle in front and U.S. Pat. No. 5,506,584 to Boles discloses a radar based system. Both systems suffer from a high false alarm rate and could be substantially improved if a pattern recognition system such as neural networks were used.

5.3 Description

Systems based on radar have suffered from the problem of being able to sufficiently resolve the images which are returned to be able to identify the other vehicles, bridges, etc. One method used for adaptive cruise control systems is to ignore everything that is not moving. This, of course, leads to accidents if this were used with the instant invention. The problem stems from the resolution achievable with radar unless the antenna is made very large. Since this is impractical for use with automobiles, only minimal collision avoidance can be obtained using radar.

Optical systems can provide the proper resolution but may require illumination with a bright light or laser. If the laser is in the optical range, there is a danger of causing eye damage to pedestrians or vehicle operators. As a minimum it will be found distracting and annoying to other vehicle operators. A laser operating in the infrared part of the electromagnetic spectrum avoids the eye danger problem and, since it will not be seen, it will not be annoying. Infrared also has the proper resolution so that pattern recognition technologies can be employed to recognize various objects, such as vehicles, in the reflected image. Infrared has another advantage from the object recognition perspective. All objects radiate and reflect infrared. The hot engine of a moving vehicle in particular is a recognizable signal. Thus, if the area around a vehicle is observed with both passive and active infrared, more information can be obtained than from radar, for example. Infrared is less attenuated by fog than optical frequencies, although it is not as good as radar. Infrared is also attenuated by snow but at the proper frequencies it has about five times the range of human sight.

Laser Radar scanning system

The digital map can be used to define the field that the laser radar scanner will interrogate. The laser radar scanner will return information as to distance to an object in the scanned field. This will cover all objects that are on or adjacent to the highway. The laser pulse can be a pixel that is one inch in diameter at 100 feet, for example. The scanner must scan the entire road at such a speed that the motion of the car can be considered significant. Alternately, a separate aiming system that operates at a much lower speed, but at the speed to permit compensation for the car angle changes. Such an aiming system is also necessary due to the fact that the road curves up and down. Therefore two scanning methods, one a slow, but for large angle motion and the other fast but for small angles are required. The large angular system requires a motor drive while the small angular system can be accomplished through the use of an acoustic wave system, such as Tellurium dioxide, which is used to drive a crystal which has a large refractive index such as Lithium Niobate ($LiNbO_3$).

The laser radar scanner can be set up in conjunction with a range gate so that once it finds a object the range can be narrowed so that only that object and other objects at the same range, 65 to 75 feet for example, are allowed to pass the receiver. In this way an image of a vehicle can be separated from the rest of the scene for identification by pattern recognition software. Once the image of the particular object has been captured, the range gate is broadened, to 20 to 500 feet for example, and the process repeated for another object. In this manner all objects in the field of interest to the vehicle can be separated and individually imaged and identified. The field of interest, of course, is the field where all objects with which the vehicle can potentially collide reside. Particular known features on the highway can be used as aids to the scanning system so that the pitch and perhaps roll angles of the vehicle can be taken into account.

Prior to the time that all vehicles are equipped with the RtZF™ system described above, roadways will consist of a mix of vehicles. In this period it will not be possible to totally eliminate accidents. It will be possible to minimize the probability of having an accident however, if a laser radar system similar to that described in Shaw U.S. Pat. No. 5,529,138 with some significant modifications is used. It is correctly perceived by Shaw that the dimensions of a radar beam are too large to permit distinguishing various objects which may be on the roadway in the path of the instant vehicle. Laser radar provides the necessary resolution that is not provided by radar. Laser radar as used in the present invention however would acquire significantly more data than anticipated by Shaw. Sufficient data in fact would be attained to permit the acquisition of a 3-dimensional image of all objects in the field of view. The X and Y dimensions of such objects would, of course, be determined knowing the angular orientation of the laser radar beam. The longitudinal or Z dimension would be obtained by the time-of-flight of the laser beam to a particular point on the object and reflected back to the detector.

At least two methods are available for resolving the longitudinal dimension for each of the pixels in the image. In one method, a laser radar pulse having a pulse width of say one nanosecond would be transmitted toward the area of interest and as soon as the reflection was received and the time-of-flight determined, a new pulse would be sent at a slightly different angular orientation. The laser, therefore, would be acting as a scanner covering the field of interest. A single detector could then be used since it would know the pixel that was being illuminated. The distance to the reflection point could be determined time-of-flight thus giving the longitudinal distance to all points in view on the object.

Alternately, the entire area of interest can be illuminated and an image focused on a CCD or CMOS array. By checking the time-of-flight to each pixel, one at a time, the distance to that point on the vehicle would be determined. A variation of this would be to use a garnet crystal as a pixel shutter and only a single detector. In this case the garnet crystals would permit the illumination to pass through one pixel at a time through to a detector.

Other methods of associating a distance to a particular reflection point, of course, can now be conceived by those skilled in the art. In the laser scanning cases, the total power required of the laser if significantly less than in the area of illuminated design However, the ability to correctly change the direction of the laser beam in a sufficiently short period of time complicates the scanning design. The system would work approximately as follows: The entire area in front of the instant vehicle, perhaps as much as a full 180 degree arc in the horizontal plane would be scanned for objects. Once one or more objects had been located, the scanning range would be severely limited to basically cover that particular object and some surrounding space. Based on the range to that object a range gate can be used to eliminate all background and perhaps interference from other objects. In this manner, a very clear picture or image of the object of interest can be obtained as well as its location and, through the use of a neural network pattern of recognition system, the identity of the object can be ascertained as to whether it is a sign, a truck, an automobile or other objects. The identification of the object will permit an estimate to be made of the object's mass and thus the severity of any potential collision.

Once a pending collision is identified, this information can be made available to the driver and if the driver ceases to heed the warning, control of the vehicle could be taken from him or her by the system. The actual usurpation of vehicle control, however, is unlikely since there are many situations on the highway where the potential for a collision cannot be accurately ascertained. Consequently, this system can be thought of as an interim solution until all vehicles have the RtZF™ system described above.

To use the laser radar in a scanning mode requires some means of changing the direction of the emitted pulses of light. One method of using a ultrasonic wave to change the difraction angle of a Lithium Niobate ($LiNbO_3$) chrystal was disclosed above. This can also be done in a variety of other ways such as through the use of a spinning mirror, such as is common with laser scanners and printers. This mirror would control the horizontal scanning, for example, with the vertical scanning controlled though a stepping motor. Alternately, one or more piezoelectric materials can be used to cause the laser radar transmitter to rotate about a pivot point. A rotating system, such as described in Shaw is the least desirable available methods due to the difficulty in obtaining a good electrical connection between the laser and the vehicle while the laser is spinning at a very high angular velocity.

Although the system described above is intended for collision avoidance or at least the notification of a potential collision, when the roadway is populated by vehicles having the RtZF™ system and vehicles which do not, its use is still desirable after all vehicles are properly equipped. It can be used to search for animals or other objects which may be on or crossing the highway, a box dropping off of a truck for example, a person crossing the road who is not paying attention to traffic, naturally motorcycles, bicycles, and other vehicles can also be monitored.

One significant problem with all previous collision avoidance systems which use radar or laser radar systems to predict impacts with vehicles, is the inability to know whether the vehicle that is being interrogated is located on the highway or is off the road. In the system of the present invention, the location of the road at any distance ahead of the vehicle would be known precisely from the sub-meter accuracy maps, thus the scanning system can ignore, for example, all vehicles on lanes where there is a physical barrier separating the lanes from the lane on which the subject vehicle is traveling. This, of course, is a common situation on super highways. Similarly, a parked car on the side of the car would not be confused with a parked car that is in the lane of travel of the subject vehicle when the road is curving. This permits the subject invention to be used for automatic cruise control. In contrast with radar systems, it does not require that vehicles in the path of the subject vehicle to be moving, thus high speed impacts into stalled traffic can be avoided.

If we use a system with a broader beam to illuminate a larger area on the road in front of the subject vehicle, and the subsequent focusing of this image onto a CCD or CMOS array, this has an advantage of permitting a comparison to be made of the passive infrared signal and the reflection of the laser radar active infrared. Metal objects, for example appear cold to passive infrared. This permits another parameter to be used to differentiate metallic objects from non-metallic objects such as foliage or animals such as deer. The breadth of the beam can be controlled and thereby a particular object can be accurately illuminated. With this system, the speed with which the beam steering is accomplished can be much slower. Naturally, both systems can be combined into the maximum amount of information to be available to the system.

Through the use of range gating, objects can be relatively isolated from the environment surrounding it other than for the section of highway. For many cases, a properly trained neural network can use this data and identify the objects. An alternate approach is to use the Fourier transform of the scene as input to neural network. The advantages of this latter approach are that the particular location of the vehicle in the image is not critical for identification.

In the future, when the system can take control of the vehicle, it will be possible to have much higher speed travel. In such cases all vehicles on the controlled roadway will need to have the RtZF™ system as described above. Fourier transforms of the objects of interest can be done optically though the use of a diffraction system. The Fourier transform of the scene can then be compared with the library of the Fourier transforms of all potential objects and through a system used in military target recognition, multiple objects can be recognized and the system then focus onto one at time to determine the degree of threat that it poses.

6. ITS+ADAPTIVE CRUISE CONTROL

6.1 Problem—Traffic Congestion

The world is experiencing an unacceptable growth in traffic congestion and attention is increasingly turning to smart highway systems to solve the problem. It has been estimated that approximately $240 billion will be spent on smart highways over the next 20 years. All of the initiatives currently being considered involve a combination of vehicle mounted sensors and sensors and other apparatus installed in or on the roadway. Such systems are expensive to install, difficult and expensive to maintain and will thus only be used on major highways. Although there will be some safety benefit from such systems, it will be limited to the highways which have the system and perhaps to only a limited number of lanes.

The RtZF™ of this invention eliminates the shortcomings of the prior art by providing a system that does not require modifications to the highway. The information as to the location of the highway is determined, as discussed above, by mapping the edges of the roadway using a process whereby the major roads of the entire country can be mapped at very low cost. Thus, the system has the capability of reducing congestion as well as saving lives on all major roads, not just those which have been chosen for high speed guided lanes.

6.3 Prior Art

6.4 Description

According to U.S. Pat. No. 5,506,584 the stated goals of the US DOT IVHS system is:

improving the safety of surface transportation increasing the capacity and operational efficiency of the surface transportation system enhancing personal mobility and the convenience and comfort of the surface transportation system reducing the environmental and energy impacts of the surface transportation system The RtZF™ of the present invention satisfies all of these goals at a small fraction of the cost of prior art systems. The safety benefits have been discussed above. The capacity increase is achieved by confining vehicles to corridors where they are then permitted to travel at higher speeds. This can be achieved immediately where carrier phase DGPS is available or with the implementation of the highway located precise location systems as shown in FIG. 6. An improvement is to add the capability for the speed of the vehicles to be set by the highway. This is a simple additional few bytes of information that can be transmitted along with the road edge location map, thus, at very little initial cost. To account for the tolerances in vehicle speed control systems, the scanning laser radar, or other technology system, which monitors for the presence of vehicles without RtZF™ is also usable as an adaptive cruise control system. Thus, if a faster moving vehicle approaches a slower moving vehicle, it will automatically slow down to keep a safe separation distance from the leading vehicle. Thus, although the system is not planned for platooning, that will be the automatic result in some cases. Thus, the maximum packing of vehicles is automatically obtained and thus the maximum vehicle flow rate is also achieved with a very simple system.

For the Intelligent Highway System (ITS) application, provision is required to prevent unequipped vehicles from entering the restricted lanes. In most cases, a barrier will be required since if an errant vehicle did enter the controlled lane, a serious accident could result. Vehicles would be checked while traveling down the road or at a tollbooth, or similar station, that the RtZF™ system was in operation without faults and with the latest updated map for the region. Only those vehicles with the RtZF™ system in good working order would be permitted to enter. The speed on the restricted lanes would be set according to the weather conditions and fed to the vehicle information system automatically as discussed above.

For ITS use, there needs to be a provision whereby a driver can signal an emergency, for example, by putting on the hazard lights. This would permit the vehicle to leave the roadway and enter the shoulder when the vehicle velocity is below some level. Once the driver provides such a signal, the roadway information system, or the network of vehicle based control systems, would then reduce the speed of all vehicles in the vicinity until the emergency has passed. This roadway information system need not be actually associated with the particular roadway and also need not require any roadway infrastructure. It a name used here to represent the collective system as operated by the network of nearby vehicle and the inter-vehicle communication system. Eventually, the occurrence of such emergency situations will be eliminated by vehicle based failure prediction systems.

6.4 Enhancements—Vehicle

There will be emergency situations develop on intelligent highways. It is difficult to access the frequency or the results. The industry has learned from airbags that if a system is developed which saves many lives but causes a few deaths, the deaths will not be tolerated. The ITS system, therefore, must operate with a very high reliability, that is approaching zero fatalities. Since the brains of the system will reside in each vehicle, which is under the control of individual owners, there will be malfunctions and the system must be able to adapt without causing accidents.

The spacing of the vehicles is the first line of defense. Secondly, each vehicle with a RtZF™ has the ability to automatically communicate to all adjacent vehicles and thus immediately issue a warning when an emergency event is occurring. Finally, with the addition of a total vehicle diagnostic system, such as disclosed in U.S. Pat. No. 5,809,437, "On Board Vehicle Diagnostic System", potential emergencies can be anticipated and thus eliminated with high reliability.

Although the application for ITS envisions a special highway lane and high speed travel, the potential exists in the present invention to provide a lower measure of automatic guidance where the operator can turn control of the vehicle over to the RtZF™ for as long as the infrastructure is available. In this case, the vehicle would operate on normal lanes but would retain its position in the lane and avoid collisions until a decision requiring operator assistance is required. At that time the operator would be notified and if he or she did not assume control of the vehicle, an orderly stopping of the vehicle on the side of the road would occur.

For all cases where vehicle steering control is assumed by the RtZF™, the algorithm for controlling the steering should be developed using neural networks or neural fuzzy systems. This is especially true for the emergency cases discussed above where it is well known that operators frequently take the wrong actions and at the least they are slow to react. Algorithms developed by other non-pattern recognition techniques do no in general have the requisite generality or complexity and are also likely to make the wrong decisions. When the throttle and breaking functions are also handled by the system, an algorithm based on neural networks is even more important.

For the ITS, the driver will enter his designation so that the vehicle knows ahead of time where to exit. Alternately, if the driver wishes to exit he merely turns on his turn signal, which tells the system and other vehicles that he or she is about to exit the controlled lane.

7. OTHER FEATURES

7.1 Blind spot Detection

The RtZF™ system of this invention also can eliminate the need for blind spot detectors such as disclosed in U.S. Pat. No. 5,530,447 to Henderson. Alternately, if a subset of the complete RtZF™ is implemented, as is expected in the initial period, the RtZF™ can be made compatible with the blind spot detector described in the '447 patent.

7.2 Incapacitated Driver

As discussed above, the RtZF™ system of this invention also handles the problem of the incapacitated driver thus eliminating the need for sleep sensors that appear in numerous U.S. Patents. Such systems have not been implemented because of their poor reliability. The RtZF™ system senses the result of the actions of the operator, which could occur for a variety of reasons including old age, drunkenness, heart attacks, drugs as well as falling asleep.

7.3 Emergencies—Car Jacking, Crime

Another enhancement that is also available is to prevent car jacking in which case the RtZF™ can have the functions of a Lojack system. In the case where a car jacking occurs, the location of the vehicle can be monitored and if an emergency button is pushed, the location of the vehicle with the vehicle ID can be transmitted.

7.4 Headlight Dimmer

The system also solves the automatic headlight dimmer problem. Since the RtZF™ equipped vehicle knows where all other RtZF™ equipped vehicles are located in its vicinity, it knows when to dim the headlights. Since it is also interrogating the environment in front of the vehicle it also knows the existence and approximate location of all non RtZF™ equipped vehicles. This is one example of a future improvement to the system. The RtZF™ is a system which lends itself to continuous improvement without having to change systems on an existing vehicle.

7.5 Rollover

It should be obvious from the above discussion that rollover accidents should be effectively eliminated by the RtZF™. In the rare case where one does occur, the RtZF™ has the capability to sense that event since the location and orientation of the vehicle is known.

8. ANTICIPATORY SENSING—SMART AIRBAGS, EVOLUTION OF THE SYSTEM

The RtZF™ is also capable of enhancing other vehicle safety systems. In particular, through knowing the location and velocity of other vehicles, for those cases where an accident cannot be avoided, the RtZF™ will in general be able to anticipate a crash and make an assessment of the crash severity using neural network technology. Even with a limited implementation of RtZF™ a significant improvement in smart airbag technology results when used in conjunction with a collision avoidance system such as described in Shaw U.S. Pat. Nos. 5,314,037 and 5,529,138 and a neural network anticipatory sensing algorithm such as disclosed in co-pending U.S. patent application Ser. No. 08/247,760 to Breed. A further enhancement would be to code the signal from RtZF™ vehicles with information that includes the size and approximate weight of the vehicle. Then if an accident is inevitable, the severity can be accurately anticipated and the smart airbag tailored to the pending event.

It can be seen by the above discussion that the RtZF™ will evolve in solving many safety, vehicle control and ITS problems. Even such technologies as steering and drive by wire will be enhanced by the RtZF™ of this invention since it will automatically adjust for failures in these systems and prevent accidents.

9. OTHER ADVANTAGES & ENHANCEMENTS

9.1 GPS and Other Measurement Improvements

One of the problems with the RtZF™ is operation in large cities such as downtown New York. In such locations, unless there are a plurality of local pseudolites or precise position location system installations, the signals from the GPS satellites can be significantly blocked. Also there is a severe multipath problem. A solution is to use the LORAN system as a backup for such locations. The accuracy of LORAN can be comparable to DGPS. Naturally, the use of multiple roadway located triple precise positioning systems would be a better solution or a complementary solution.

The use of geo-synchronous satellites as a substitute for earth bound base stations in a DGPS system, with carrier phase enhancements for sub-meter accuracies, is also a likely improvement to the RtZF™ system that can have a significant effect in downtown areas.

Another enhancement that would be possible with dedicated satellites and/or earth bound pseudolites results from the greater control over the information transmitted than is available from the GPS system. Recognizing that this system could save up to 40,000 lives per year in the U.S. alone, the cost of deploying such special purpose stations can easily be justified. For example, say there exists a modulated wave that is 10000 kilometers long, another one which is 1000 km long etc. down to 1 cm. It would then be easy to determine the absolute distance from one point to the other. Other types of modulation are of course possible to achieve the desired result of simply eliminating the carrier integer uncertainty that is discussed in many U.S. patents and other literature. This is not meant to be a recommendation but to illustrate that once the decision has been made to provide information to every vehicle that will permit it to always know its location within 10 cm, many technologies will be

9.2 Vehicle Enhancements

The RtZF™ system can now be used to improve the accuracy of other vehicle based instruments. The accuracy of the odometer and yaw rate sensors can be improved over time, for example, by regression against the DGPS data.

9.3 Highway Enhancements

Enhancements to the roadways that result from the RtZF™ include traffic control. The timing of the stoplights can now be automatically adjusted based on the relative traffic flow. The position of every vehicle within the vicinity of the light will be known.

Since the road conditions will now be known to the system, an enhanced RtZF™ system will be able to advise an operator not to travel or, alternately, it can pick an alternate route if certain roads have accidents or iced over roadways, for example. Some people may decide not drive if there is bad weather or congestion. The important point here is that sensors will be available to sense the road condition as to both traffic and weather, this information will be available automatically and not require reporting from a weather station which has only late and inaccurate information.

9.4 Map Enhancements

Once the road edge and lane locations are being transmitted to the operator, it requires very little additional bandwidth to include other information such as the location of all businesses that a traveler would be interested in such as gas stations, restaurants etc. which could be done on a subscription basis. This concept was partially disclosed in the '482 patent discussed and partially implemented in existing map databases.

Naturally, the communication of information to the operator could be done either visually or orally as described in U.S. Pat. No. 5,177,685. Finally, the addition of a route guidance system as disclosed in other patents becomes even more feasible since the exact location of a destination can be determined. The system can be configured so that an operator could enter a phone number, for example, or an address and the vehicle would be automatically and safely driven to that location. Since the system knows the location of the edge of every roadway, very little if nay operator intervention would be required.

9.5 Other Uses

The RtZF™ can even replace other sensors now on or being considered for automobile vehicles including Pitch, roll and yaw sensors. This information can be found by adding more antennas to the vehicle. Additionally, once the system is in place for land vehicles, there will be many other applications such as surveying, vehicle tracking and aircraft landing which will benefit from the technology and infrastructure improvements. The automobile safety issue and ITS will result in the implementation of a national system which provides any user with low cost equipment the ability to know precisely where he is within centimeters on the face of the earth. Many other applications will undoubtedly follow.

10. THE RtZF™ SYSTEM

The design of this system is only beginning. From the above discussion two conclusions should be evident. There are significant advantages in accurately knowing where the vehicle, the roadway and other vehicles are and that this information is the key to reducing fatalities to zero. Secondly, there are many technologies that are already in existence that can provide this information to each vehicle. Once there is a clear direction that this is the solution then many new technologies will emerge. There is nothing inherently expensive about these technologies and once the product life cycle is underway the added cost to vehicle purchasers will be minimal. Roadway infrastructure costs will be minimal and system maintenance costs almost non-existent.

Most importantly, the system has the capability of reducing fatalities to zero!

11. DETAILED DESCRIPTION OF THE ILLUSTRATIONS

FIG. 1 shows the current GPS satellite system associated with the earth and including 24 satellites 102, each satellite revolving in a specific orbital path 104 around the earth. By means of such a GPS satellite system, the position of any object can be determined with varying degrees of preciseness.

Figure 2:
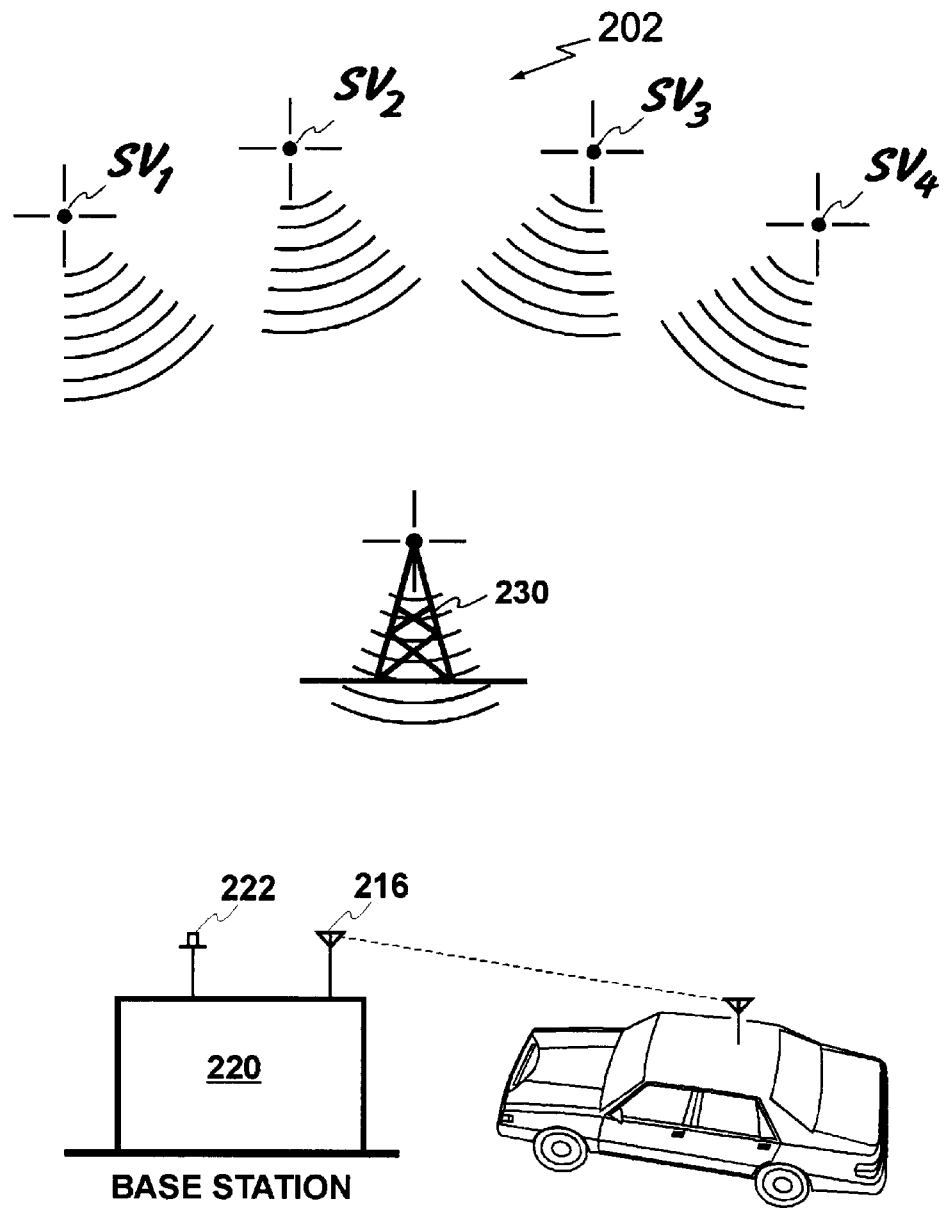
FIG. 2 illustrates four such satellites and a pseudolite transmitting position information to a vehicle and to a base station which in turn transmits the differential correction signal to the vehicle.

FIG. 2 shows an arrangement 202 of four satellites SV1, SV2, SV3 and SV4 of the GPS satellite system shown in FIG. 1 and a pseudolite 230 transmitting position information to receiver means of a base station 220, such as an antenna 222, which in turn transmits a differential correction signal via transmitter means associated with that base station, such as a second antenna 216, to a vehicle 218.

Figure 3:
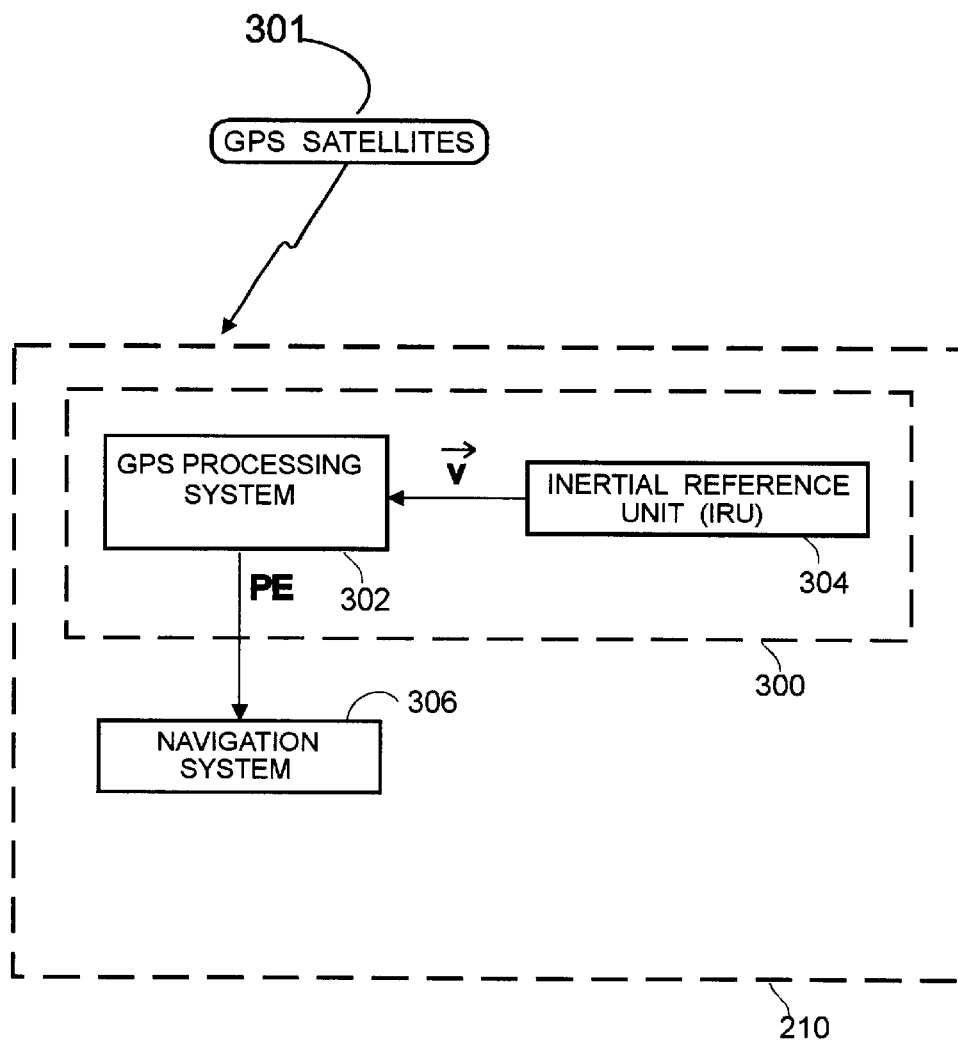
FIG. 3 is a logic diagram showing the combination of the GPS system and an inertial navigation system.

FIG. 3 is a logic diagram of the system 210 in accordance with the invention (illustrated in greater detail in FIG. 7) showing the combination of the GPS system 300 and an inertial navigation system 306. The GPS system includes a unit 302 for processing the received information from the satellites 301 of the GPS satellite system and data from an inertial reference unit (IRU) 304.

Additional details relating to FIGS. 1–3 can be found in U.S. Pat. No. 5,606,506 to Kyrtsos.

Figure 4:
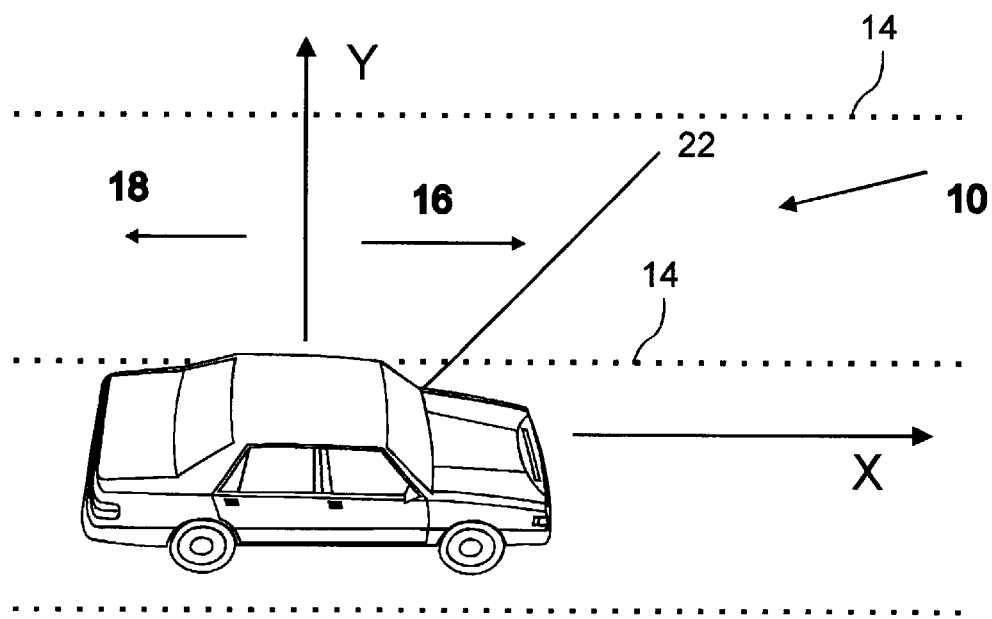
FIG. 4 illustrates a vehicle traveling on a roadway in a defined corridor.

FIG. 4 shows the implementation of the invention in which a vehicle 10 is traveling on a roadway or traffic lane in a defined corridor in the direction X. Each corridor is defined by lines 14. If the vehicle is traveling in one corridor and strays in the direction Y so that it moves along the line 22, e.g., the driver is falling asleep, the system on board the vehicle in accordance with the invention will be continually detecting the position of the vehicle, such as by means of the GPS system, and have stored the locations of the lines 14 defining the corridor. Upon an intersection of the position of the vehicle and one of the lines 14 as determined by a processor, the system may be designed to sound an alarm to alert the driver to the deviation or possibly even correct the steering of the vehicle to return the vehicle to within the corridor defined by a pair of lines 14.

FIG. 5 shows the implementation of the invention in which a pair of vehicles 26,30 are traveling on a roadway or traffic lane each in a defined corridor delineated by lines 14 and each is equipped with a system in accordance with the invention. The system will receive data informing it of the position of the other vehicle and prevent accidents from occurring.

FIG. 6 shows the implementation of the invention in which a pair of vehicles 26,30 are traveling on a roadway or traffic lane each in a defined corridor delineated by lines 14 and each is equipped with a system in accordance with the invention. The system will receive data informing it of the position of the other vehicle as well as the position of trees 51,52,53 on the side of the roadway or traffic lane and prevent accidents between the vehicles and between the vehicle and the trees 51,52,53 from occurring.

FIG. 7 is a schematic representation of the system 210 in accordance with the invention. System 210 detects the absolute position of the vehicle, such as by means of the GPS system 44 and has stored the locations of the edges of the roadways and traffic lanes (the lines 14 defining the corridor as shown in FIGS. 4–6) in a memory unit 46. Upon intersection of the position of the vehicle and the edges of the roadway or traffic lane as determined by a processor 48, the system may be designed to sound an alarm to alert the driver to the deviation or possibly even correct the steering of the vehicle to return the vehicle to within the corridor defined by a pair of lines 14 (the alarm and steering guidance unit being represented as reactive system 50). The position determining means 44 may include an optional inertial navigation system 54.

Means for determining the presence, location and/or velocity of other vehicles 56 on the roadway or traffic lane (any known type of detection system such as those using radar, electromagnetic radiation, etc.) are coupled to the processor 48 which can then determine the location of the other vehicles relative to the edges of the roadway or traffic lane and provide a signal to alert means 52 (e.g., an alarm) to alert the other vehicles if the location of the other vehicles approach close to an edge of the roadway or traffic lane or intersect with an edge of the roadway or traffic lane.

A communications unit 58 is also coupled to the processor 48 to enable communication of data regarding, e.g., the location and velocity of the vehicle, between vehicles equipped with the same or a compatible system.

An automatic driving system 60 can be integrated with the steering unit and acceleration unit of the vehicle and coupled to the processor 48 to guide the vehicle in the roadway or traffic lane, i.e., such that the position of the vehicle does not come close to or intersect the edges of the roadway or traffic lane.

FIG. 8 is a flow chart of the method in accordance with the invention. The absolute position of the vehicle is determined at 62, e.g., using a GPS system, and compared to the edges of the roadway or traffic lane at 66 which is obtained from a memory unit 64. Based on the comparison at 66, it is determined whether the absolute position of the vehicle is approaching close to or intersects an edge of the roadway or traffic lane at 68. If not, then the position of the vehicle is again obtained and the process continues. If yes, an alarm will sound or the system will take control of the vehicle (at 70) to guide it to a shoulder of the roadway or traffic lane or other safe location.

We claim:

1. A system for preventing vehicle accidents, comprising
position determining means for determining the absolute position of a first vehicle, said position determining means comprising a receiver arranged in the first vehicle and structured and arranged to receive position data from a GPS satellite network and receive wide-area differential GPS correction data,
memory means for storing data relating to edges of roadways on which the first vehicle may travel,
processing means coupled to said determining means and said memory means for comparing the absolute position of the first vehicle as determined upon the reception of the position data from the satellite network and wide-area differential GPS correction data by said receiver to the edges of the roadway in order to determine the location of the first vehicle relative to the edges of the roadway,
reaction means coupled to said processing means for affecting a system on the first vehicle when the location of the first vehicle approaches close to an edge of the roadway or intersects with an edge of the roadway, and
communication means arranged in the first vehicle and coupled to said processing means for receiving a communication of data including at least one of the size, type, mass and orientation of other vehicles, said processing means being structured and arranged to determine whether another vehicle is likely to impact the first vehicle in a manner requiring defensive action based at least in part on the at least one of the size, type, mass and orientation of the other vehicle and if so, affecting another system in the vehicle to initiate a warning or defensive action.

2. The system of claim 1, further comprising means for determining at least one of the presence, location and velocity of other vehicles on the roadway.

3. The system of claim 2, wherein said processing means are structured and arranged to determine the location of the other vehicles relative to the edges of the roadway.

4. The system of claim 3, further comprising alert means for alerting the other vehicles when the location of the other vehicles approaches close to an edge of the roadway or intersect with an edge of the roadway.

5. The system of claim 1, wherein said communication means are structured and arranged to enable the first vehicle to communicate with other vehicles similarly equipped with the accident preventing system such that the location and optionally velocity of the other vehicles is communicated to the first vehicle by the other similarly equipped vehicles.

6. The system of claim 1, further comprising automatic driving means coupled to said memory means and a steering unit and acceleration unit of the first vehicle for guiding the first vehicle within the edges of the roadway.

7. The system of claim 1, wherein said processing means are structured and arranged to receive data on at least one of weather conditions and traffic accidents.

8. The system of claim 7, wherein said processing means are structured and arranged to control operation of the first vehicle based on the at least one of weather conditions and traffic accidents.

9. The system of claim 1, wherein said position determining means further comprise a network of earth-based stations which provide the wide-area differential GPS correction data.

10. The system of claim 1, wherein the satellite network includes base stations for generating differential correction signals to the first vehicle.

11. The system of claim 1, wherein said position determining means further comprise an inertial navigation system.

12. The system of claim 1, wherein said processing means are structured and arranged to receive and display data on at least one of weather conditions and traffic accidents.

13. The system of claim 1, wherein said reaction means comprise an alarm.

14. The system of claim 1, wherein said reaction means comprise vehicle guidance system for automatically guiding the first vehicle.

15. The system of claim 1, wherein said position determining means further comprise an additional receiver capable of receiving electromagnetic waves such that reception of waves from multiple known locations are considered in the determination of the absolute position of the first vehicle.

16. A method for preventing vehicle accidents, comprising the steps of:
   determining the absolute position of the vehicle, said step of determining the absolute position of the vehicle comprising the steps of arranging on the vehicle a receiver capable of receiving position data from a GPS satellite network and wide-area differential GPS correction data, determining a model indicative of errors in GPS measurements, transmitting position data to the receiver, transmitting the model to the receiver to enable correction of the position data in consideration of the model to thereby accurately determine the absolute position of the vehicle,
   storing data relating to edges of roadways on which the vehicle may travel,
   determining the location of the vehicle relative to the edges of the roadway by comparing the absolute position of the vehicle as determined upon the reception of the position data and the wide-area differential GPS correction data by the receiver to the edges of the roadways,
   affecting a system within the vehicle when the location of the vehicle approaches close to an edge of the roadway or intersects with an edge of the roadway,
   receiving a communication of data including at least one of the size, type, mass and orientation of other vehicles by means of a communication unit in the vehicle, and
   determining whether another vehicle is likely to impact the vehicle in a manner requiring defensive action based at least in part on the at least one of the size, type, mass and orientation of the other vehicle and if so, affecting another system in the vehicle to initiate a warning or defensive action.

17. The method of claim 16, further comprising the step of:
   determining at least one of the presence, location and velocity of other vehicles on the roadway.

18. The method of claim 17, further comprising the step of:
   determining the location of the other vehicles relative to the edges of the roadway.

19. The method of claim 17, further comprising the step of:
   alerting the other vehicles when the location of the other vehicles approaches close to an edge of the roadway or intersects with an edge of the roadway.

20. The method of claim 16, wherein the communication unit enables the vehicle to communicate with other vehicles similarly equipped with the accident preventing system such that the location and optionally velocity of the other similarly equipped vehicles is communicated to the vehicle.

21. The method of claim 20, wherein the vehicles communicate with each other by utilizing a portion of the electromagnetic spectrum that permits only line of sight communication.

22. A system for preventing vehicle accidents, comprising
   a positioning system arranged in a first vehicle for determining the absolute position of the first vehicle, said positioning system comprising a receiver arranged in the first vehicle and structured and arranged to receive position data from a GPS satellite network and receive wide-area differential GPS correction data,
   a memory unit for storing data relating to edges of lanes on which the first vehicle may travel,
   a processor coupled to said positioning system and said memory unit for comparing the absolute position of the first vehicle as determined upon the reception of the position data from the satellite network and wide-area differential GPS correction data by said receiver to the edges of the lanes in order to determine the location of the first vehicle relative to the edges of the lane,
   a reactive component or system arranged in the first vehicle and coupled to said processor, said component or system being arranged to initiate an action or change its operation if when the location of the vehicle approaches close to an edge of the lane or intersects with an edge of the lane, and
   a communication unit arranged in the first vehicle and coupled to said processor for receiving a communication of data including at least one of the size, type, mass and orientation of other vehicles, said processor being structured and arranged to determine whether another vehicle is likely to impact the first vehicle in a manner requiring defensive action based at least in part on the at least one of the size, type, mass and orientation of the other vehicle and if so, affecting another system in the vehicle to initiate a warning or defensive action.

23. The system of claim 22, wherein said positioning system includes base stations for generating differential correction signals to the first vehicle.

24. The system of claim 22, wherein said positioning system further comprising an inertial navigation system.

25. The system of claim 22, further comprising a determination system arranged on the first vehicle for determining at least one of the presence, position and velocity of other vehicles on the lane.

26. The system of claim 25, wherein said determination system determines the position of the other vehicles on the lane relative to the first vehicle, said processor being structured and arranged to determine the position of the other vehicles relative to the edges of the lane based on the data relating to edges of the lane.

27. The system of claim 26, further comprising a warning system for alerting the other vehicles when the location of the other vehicles approaches close to an edge of the lane or intersects with an edge of the lane.

28. The system of claim 22, wherein said communication unit is structured and arranged to enable the first vehicle to communicate with other vehicles similarly equipped with the accident preventing system such that the location and optionally velocity of the other vehicles is communicated to the first vehicle by the other similarly equipped vehicles.

29. The system of claim 22, further comprising an automatic driving and guidance unit arranged in the first vehicle and coupled to the memory unit and a steering unit and acceleration unit of the first vehicle for guiding the first vehicle within the edges of the lane.

30. The system of claim 22, wherein said processor is structured and arranged to receive data on at least one of weather conditions and traffic accidents.

31. The system of claim 30, wherein said processor is structured and arranged to control operation of the first vehicle based on the at least one of weather conditions and traffic accidents.

32. The system of claim 22, wherein said processor is structured and arranged to receive and display data on at least one of weather conditions and traffic accidents.

33. The system of claim 22, wherein said positioning system further comprises a network of earth-based stations which provide the wide-area differential GPS correction data.

34. The system of claim 22, wherein said reactive component or system is an alarm.

35. The system of claim 22, wherein said reactive component is a vehicle guidance system for automatically guiding the first vehicle.

36. The system of claim 22, wherein said position determining means further comprise an additional receiver capable of receiving electromagnetic waves such that reception of waves from multiple known locations are considered in the determination of the absolute position of the first vehicle.

* * * * *